(12) United States Patent
Kusuda et al.

(10) Patent No.: US 9,874,757 B2
(45) Date of Patent: Jan. 23, 2018

(54) IMAGE DISPLAY APPARATUS AND HEAD MOUNT DISPLAY

(71) Applicant: Brother Kogyo Kabushiki Kaisha, Nagoya-shi, Aichi-ken (JP)

(72) Inventors: Miyuki Kusuda, Nagoya (JP); Nobuo Hiraki, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 20 days.

(21) Appl. No.: 15/056,267

(22) Filed: Feb. 29, 2016

(65) Prior Publication Data
US 2016/0178912 A1    Jun. 23, 2016

Related U.S. Application Data

(63) Continuation-in-part of application No. PCT/JP2014/072543, filed on Aug. 28, 2014.

(30) Foreign Application Priority Data

Aug. 30, 2013 (JP) .................................. 2013-179762
Jul. 30, 2014 (JP) .................................. 2014-154952

(51) Int. Cl.
G02B 27/14    (2006.01)
G02B 27/01    (2006.01)
(Continued)

(52) U.S. Cl.
CPC ..... *G02B 27/0176* (2013.01); *G02B 27/0172* (2013.01); *G02B 27/40* (2013.01);
(Continued)

(58) Field of Classification Search
CPC .............. G02B 27/2214; G02B 26/004; G02B 27/0176; G02B 27/1033; G02B 27/1053;
(Continued)

(56) References Cited

U.S. PATENT DOCUMENTS

| 5,451,976 A | 9/1995 | Ito |
| 5,486,841 A * | 1/1996 | Hara .................. G02B 7/12 345/8 |

(Continued)

FOREIGN PATENT DOCUMENTS

| JP | H01-136928 U | 9/1989 |
| JP | H05-276467 A | 10/1993 |

(Continued)

OTHER PUBLICATIONS

Mar. 1, 2016—(JP) Office Action—App 2013-179762.
(Continued)

*Primary Examiner* — Brandi Thomas
(74) *Attorney, Agent, or Firm* — Banner & Witcoff, Ltd.

(57) ABSTRACT

A head mount display (HMD) includes: an image unit; a lens unit; and a housing including a first surface arranged on the front side, a second surface extending rearward from an upper side of the first surface, and a third surface extending rearward from a lower side of the first surface. The HMD further includes a half mirror provided on the left side of the housing and on the left side relative to the lens unit and deflecting, rearward, image light led by the lens unit; an operating member provided on the left side relative to the center in right and left directions of the housing within the first surface and rotating about an axis extending in frontward and rearward directions; and an adjustment mechanism connected to at least one of the image unit and the lens unit and moving the unit(s) according to rotation of the operating member.

12 Claims, 22 Drawing Sheets

(51) Int. Cl.
*G02B 27/40* (2006.01)
*H04N 5/64* (2006.01)

(52) U.S. Cl.
CPC ........... *G02B 2027/0127* (2013.01); *G02B 2027/0143* (2013.01); *G02B 2027/0159* (2013.01); *H04N 5/64* (2013.01)

(58) Field of Classification Search
CPC ........... G02B 27/1086; G02B 27/225; G02B 5/0236; G02B 5/0278; G02B 2027/0127; G02B 2027/0143; G02B 2027/015; G02B 2027/0159; G02B 2027/0178; G02B 2027/0181; G02B 27/017
USPC ................................................. 359/619–633
See application file for complete search history.

(56) References Cited

U.S. PATENT DOCUMENTS

| | | | |
|---|---|---|---|
| 7,038,667 | B1 | 5/2006 | Vassallo et al. |
| 2012/0200934 | A1* | 8/2012 | Fujishiro ............ G02B 27/0172 359/630 |

FOREIGN PATENT DOCUMENTS

| | | | |
|---|---|---|---|
| JP | H06-123852 | A | 5/1994 |
| JP | H07-084234 | A | 3/1995 |
| JP | H11-084474 | A | 3/1999 |
| JP | H11-109447 | A | 4/1999 |
| JP | 2000-214371 | A | 8/2000 |
| JP | 2001-109558 | A | 4/2001 |
| JP | 2002-156572 | A | 5/2002 |
| JP | 2002-162597 | A | 6/2002 |
| JP | 2004-286833 | A | 10/2004 |
| JP | 2005-173033 | A | 6/2005 |
| JP | 2005-284130 | A | 10/2005 |
| JP | 2007-325105 | A | 12/2007 |
| JP | 2012-093495 | A | 5/2012 |
| JP | 2012-163641 | A | 8/2012 |
| JP | 2012-194501 | A | 10/2012 |
| JP | 2013-044828 | A | 3/2013 |
| JP | 2013-044896 | A | 3/2013 |

OTHER PUBLICATIONS

Oct. 7, 2014—International Search Report—Intl App PCT/JP2014/072543.
Apr. 4, 2017—(JP) Notification of Reason for Refusal—App 2014-154957.
Mar. 1, 2016—(PCT) IPRP—App PCT/JP2014/072543—English Translation.

* cited by examiner

FIG.3
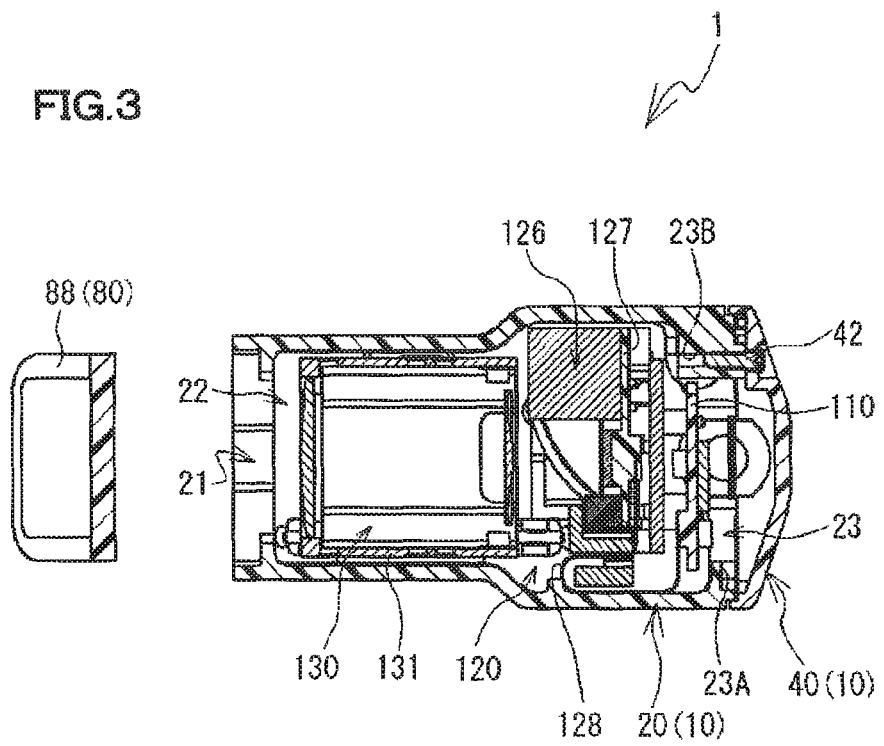
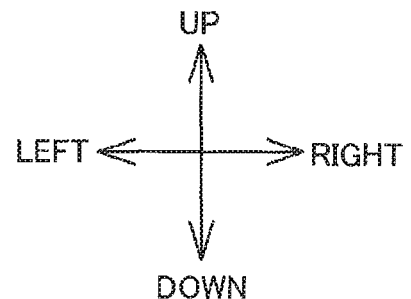

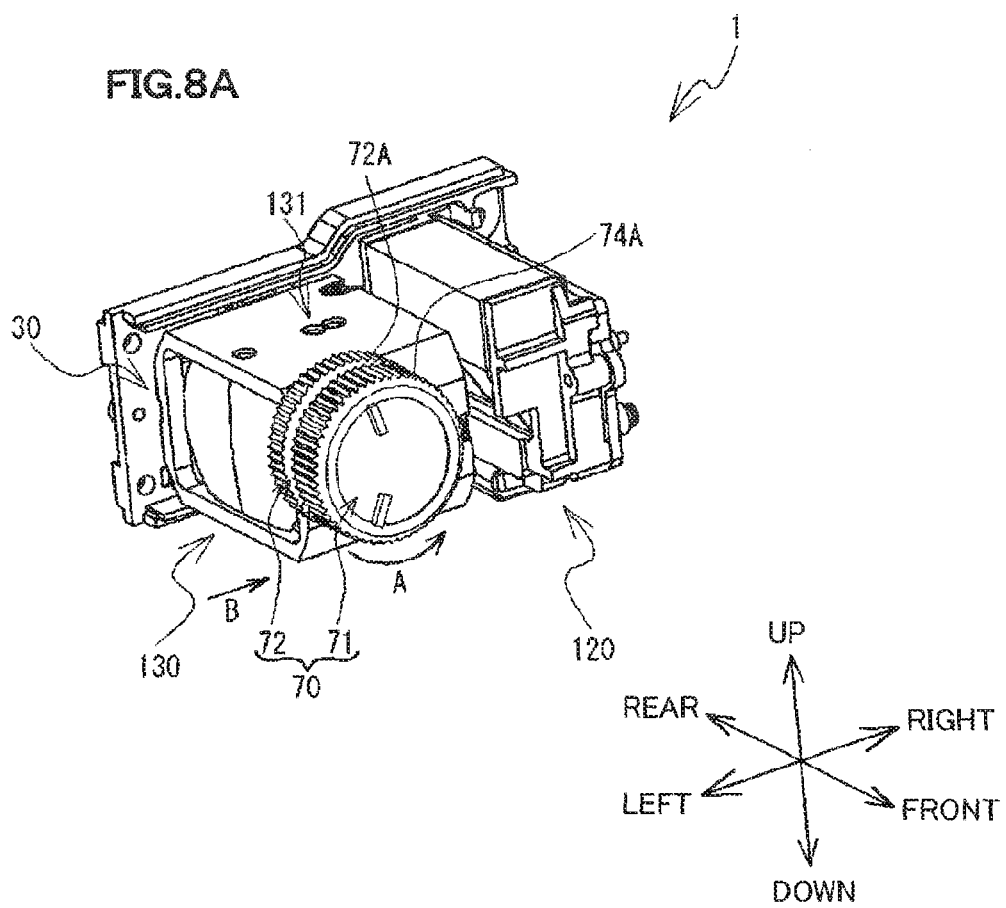

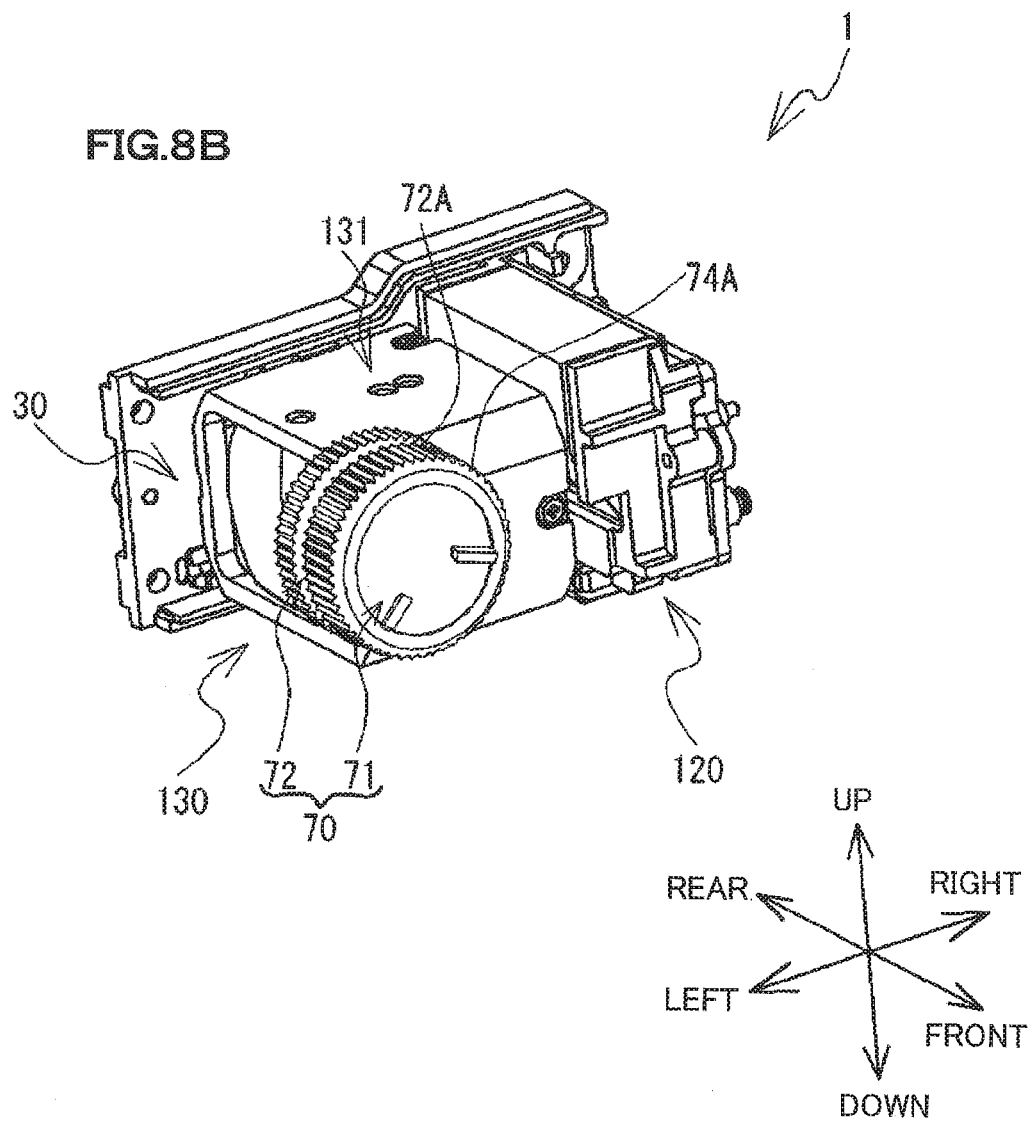

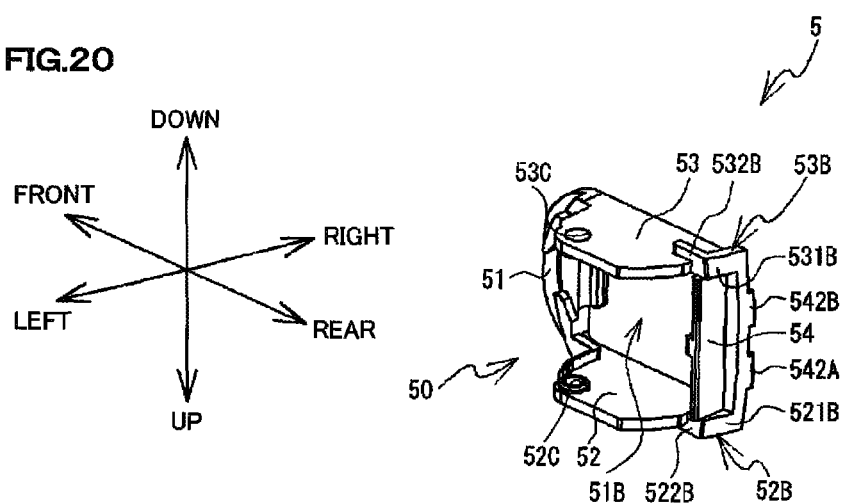
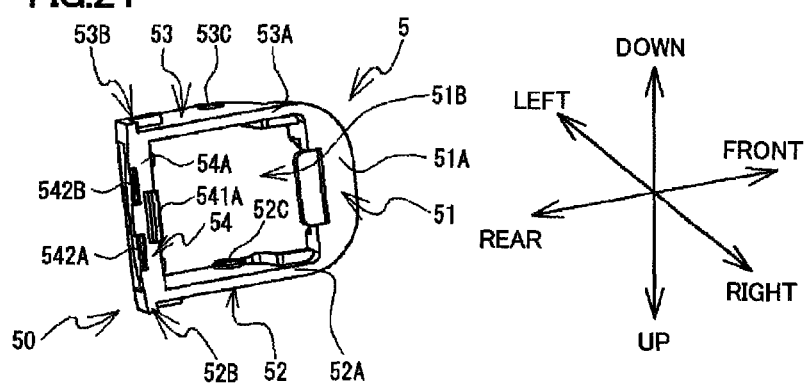

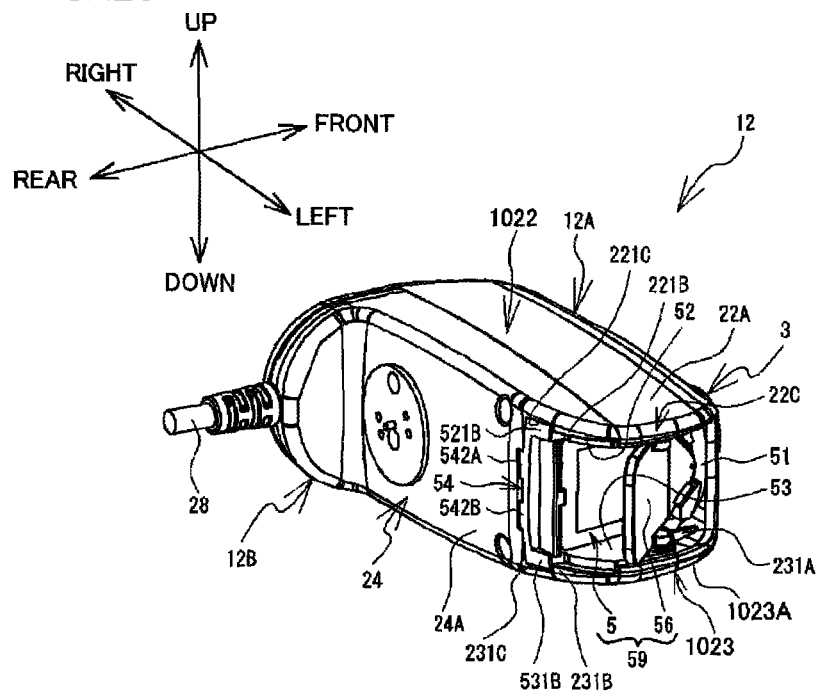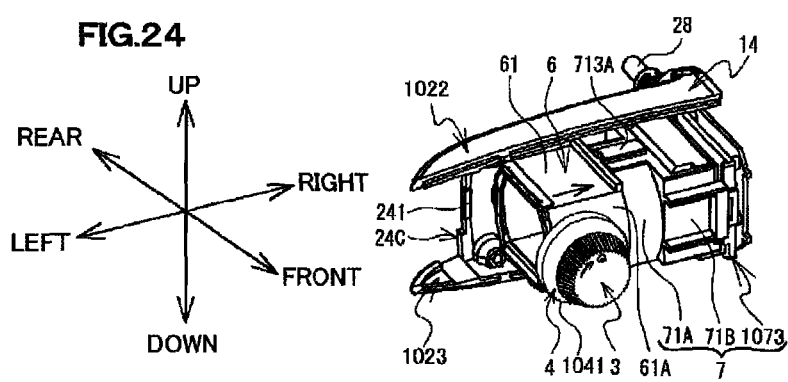

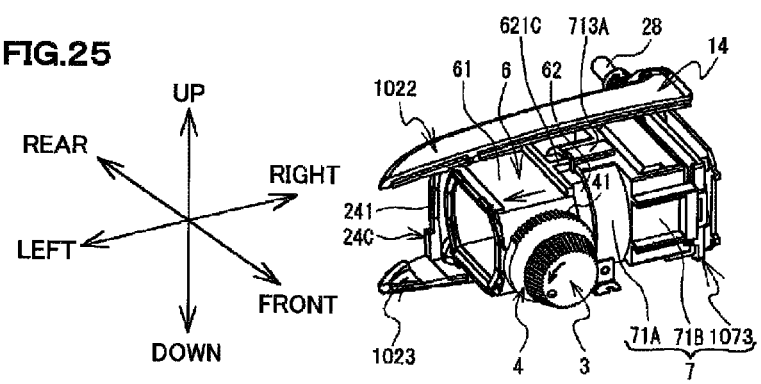
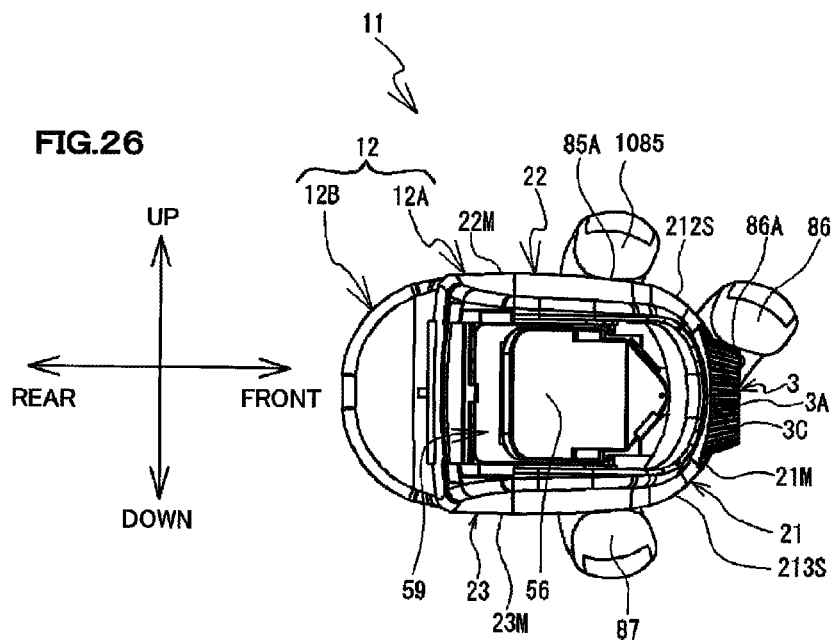

IMAGE DISPLAY APPARATUS AND HEAD MOUNT DISPLAY

CROSS-REFERENCE TO RELATED APPLICATIONS

This application is a Continuation-In-Part application of PCT International Application No. PCT/JP2014/072543 which has an International filing date of Aug. 28, 2014 and designated the United States of America, and claiming priority on Patent Application No. 2013-179762 filed in Japan on Aug. 30, 2013 and Patent Application No. 2014-154952 filed in Japan on Jul. 30, 2014.

TECHNICAL FIELD

The present disclosure relates to an image display apparatus and a head mount display (HMD) employing the image display apparatus.

BACKGROUND

In the conventional art, an HMD is known in which focus adjustment is allowed. For example, an HMD of monocular type is known that presents an image to user's one eye. The HMD includes an adjuster for focus adjustment. The adjuster has a ring shape and is rotatable about an axis serving as a pivot and extending in the same direction as the longitudinal direction (referred to as the "right and left directions", hereinafter) of the housing. A part of the adjuster is exposed to the outside through a slit provided in the housing. The optical axial distance between a liquid crystal display holder and a lens holder in the housing varies in accordance with rotation of the adjuster. The user performs operation of applying a force on the portion exposed from the slit within the adjuster, in the up and down directions perpendicular to the right and left directions by using a finger and thereby rotates the adjuster. By virtue of this, the user changes the optical axial distance between the liquid crystal display holder and the lens holder and thereby performs focus adjustment.

SUMMARY

Usually, in a state that the HMD is attached in front of one eye, the user performs focus adjustment by using the hand on the side where the HMD is attached. This is because if focus adjustment were performed by using the hand on the side opposite to the side where the HMD is attached, this hand on the opposite side would be located in front of the eye on the side opposite to the side of attachment of the HMD so that the field of view would be blocked. At that time, in some cases, the force applied on the adjuster by the user moves the housing in the up and down directions. Thus, in order to suppress the movement of the housing in the up and down directions, the user holds the housing by pinching the housing from the up and down directions by using the index or middle finger and the thumb. In this state, the user applies a force in the up and down directions onto the adjuster by using any of the remaining fingers and thereby rotates the adjuster. Here, the action that in a state that the housing is pinched by the index or middle finger and the thumb, any of the remaining fingers is moved in the up and down directions indicates that in a state that the positions of the index or middle finger and the thumb are fixed, the any of the remaining fingers is to be moved up and down. Thus, the index or middle finger needs to be separated from the any of the remaining fingers. This action is unnatural for the user. Thus, a problem arises that the user is not allowed to easily operate the adjuster at the time of focus adjustment.

An object of the present disclosure is to provide an image display apparatus and a head mount display in which operability at the time of focus adjustment is satisfactory.

One aspect of the present disclosure is an image display apparatus comprising:

an image unit configured to generate image light;

a lens unit including a plurality of lenses whose optical axes extend in a first direction and arranged on one side in the first direction relative to the image unit;

a housing covering at least a part of the image unit and the lens unit and including, relative to the image unit and the lens unit, at least a first face arranged on one side in a second direction perpendicular to the first direction, a second face extending from one side in a third direction perpendicular toward both the first direction and the second direction within the first face toward the other side in the second direction, and a third face extending from the other side in the third direction toward the other side in the second direction;

a deflection member provided on the one side in the first direction of the housing and on the one side in the first direction relative to the lens unit and deflecting the image light led by the lens unit toward the other side in the second direction;

an operating member provided at a position on the one side relative to a center in the first direction of the housing within the first face and configured to rotate about an axis extending in the second direction as a pivot; and an adjustment mechanism engaging with at least one of the image unit and the lens unit and configured to move at least one of the image unit and the lens unit toward the first direction in accordance with rotation of the operating member.

An example is employed that a user arranges the image display apparatus in front of the eye on the other side in the first direction defined in a situation that the image display apparatus is viewed from the front side (that is, on one side in the first direction of the user), then holds the housing by pinching the second face and the third face of the housing from the up and down directions through the use of the index or middle finger and the thumb of the hand on the other side in the first direction, and then applies a force on the operating member provided in the first face so as to rotate the operating member by using any of the remaining fingers. Here, the operating member is rotatable about the axis extending in the second direction and serving as a pivot. Thus, the user may move any of the remaining fingers toward a direction inclined in the right and left directions relative to the up and down directions and is thereby allowed to rotate the operating member. Here, the action that the remaining finger is moved in the direction inclined in the right and left directions is allowed to be achieved when the user stretches and retracts the remaining finger. Thus, the user is allowed to naturally perform the action of rotating the operating member. Accordingly, in the image display apparatus, the operability of the operating member at the time that the user performs focus adjustment becomes satisfactory.

Further, the operating member is provided at a position on the one side relative to the center in the first direction within the first face. By virtue of this, when the user holds the housing by using the index or middle finger and the thumb, the contact areas of the index or middle finger and the thumb with the housing (the second face and the third face) are allowed to made larger. Thus, the user is allowed to operate the operating member in a state that the housing is appropriately held.

The other aspect of the present disclosure is a head mount display comprising:

the above-described image display apparatus;

a mounting member including a first portion extending in the first direction and a pair of second portions extending from both sides of the first portion toward the other side in the second direction; and a connecting member connected to the first portion of the mounting member and connected to the image display apparatus.

According to this, in a state that the mounting member is attached to the user's head, the deflection member is allowed to be held in front of the user's eye. Thus, with visually recognizing the image light deflected by the deflection member, the user is allowed to perform work by using both hands The above and further objects and features will more fully be apparent from the following detailed description with accompanying drawings.

BRIEF DESCRIPTION OF THE SEVERAL VIEWS OF THE DRAWINGS

FIG. 3 is a sectional view taken on line I-I and viewed in the direction of arrows in FIG. 2.

FIG. 8A is a diagram illustrating a situation that the eyepiece optical system 130 is arranged on the leftmost side.

FIG. 8B is a diagram illustrating a situation that the eyepiece optical system 130 is arranged on the rightmost side.

FIG. 20 is a perspective view of a holder 5.

FIG. 21 is a perspective view of the holder 5.

FIG. 23 is a diagram illustrating a situation that the holder 5 and the half mirror 56 are attached to the housing 12.

FIG. 24 is a perspective view of the lens unit 6, the image unit 7, an operating member 3, and the adjustment mechanism 4 in a first state.

FIG. 25 is a perspective view of the lens unit 6, the image unit 7, the operating member 3, and the adjustment mechanism 4 in a second state.

FIG. 26 is a left side view of a body member 11.

DETAILED DESCRIPTION

First Embodiment

An HMD 1 according to an embodiment of the present disclosure is described below with reference to the drawings. In the following description, obliquely upward left, obliquely downward right, obliquely downward left, obliquely upward right, left, and right in FIG. 1 are respectively defined as upward, downward, frontward, rearward, leftward, and rightward of the HMD 1.

First, outlines of the HMD 1 are described below. Light of a scene in front of a user is transmitted through a half mirror 80 (see FIG. 2, described later) and then led directly to the user's eye. Light of an image displayed on a liquid crystal display 126 (see FIG. 3, described later) is reflected by a half mirror 80 so as to be led to the user's eye. By virtue of this, in the HMD 1, the user is allowed to recognize the scene in front of the user and the generated image in an overlaid manner with each other.

(1) Housing 10 (First Housing 20 and Third Housing 40)

Figure 1:
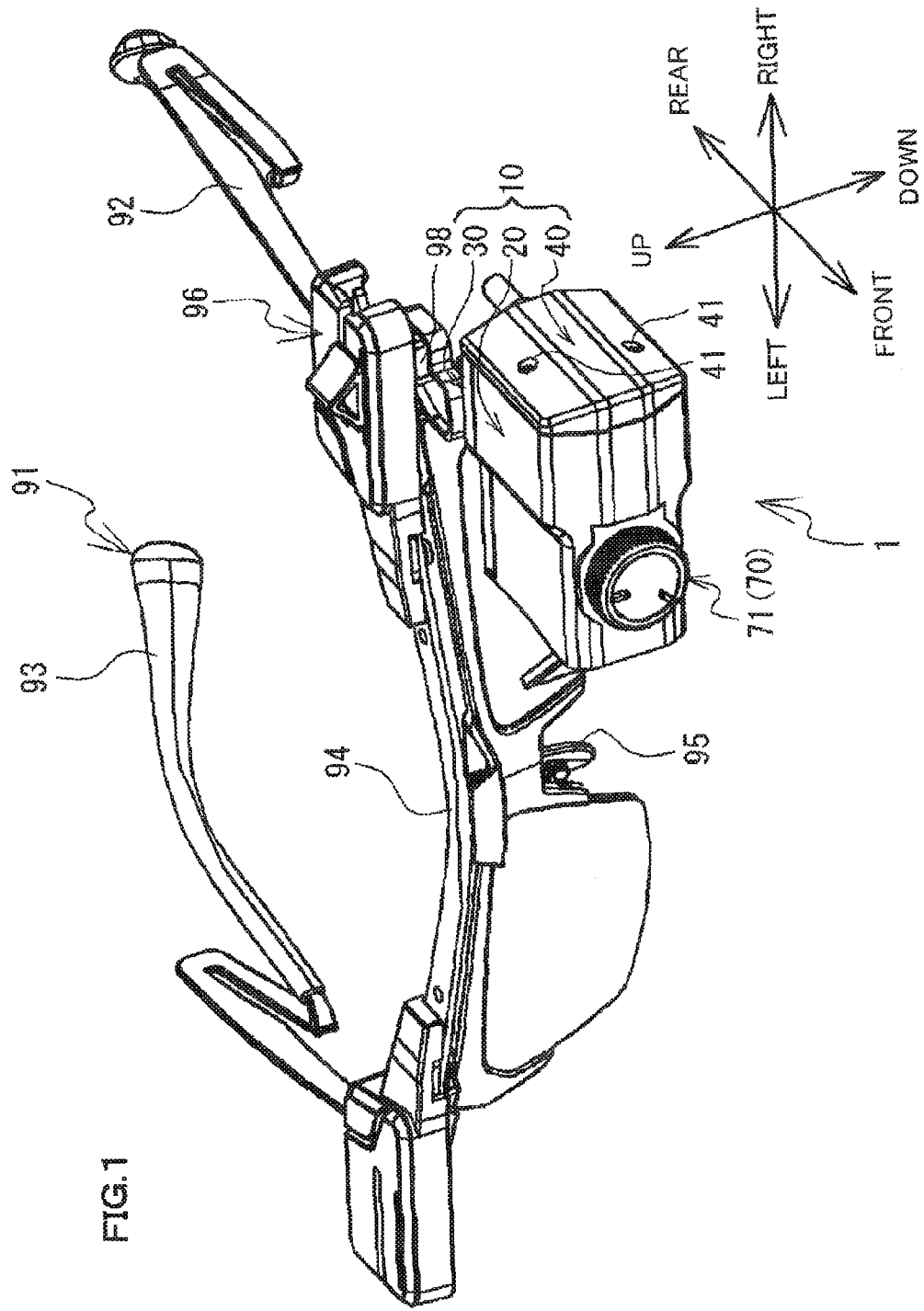
FIG. 1 is a perspective view of a glasses-type frame 91 equipped with an HMD 1.

As illustrated in FIG. 1, the HMD 1 includes a housing 10. The housing 10 has a hollow rectangular parallelepiped shape extending in the right and left directions. The housing 10 is attached to a glasses-type frame 91 in an attachable and detachable manner. The glasses-type frame 91 includes a left frame part 92, a right frame part 93, a center frame part 94, and an HMD support part 96. The HMD support part 96 serving as an example of a connecting member is provided on the right end side in the upper face of the center frame part 94. The HMD support part 96 includes a downward extending part 98. The downward extending part 98 extends in the up and down directions.

Figure 2:
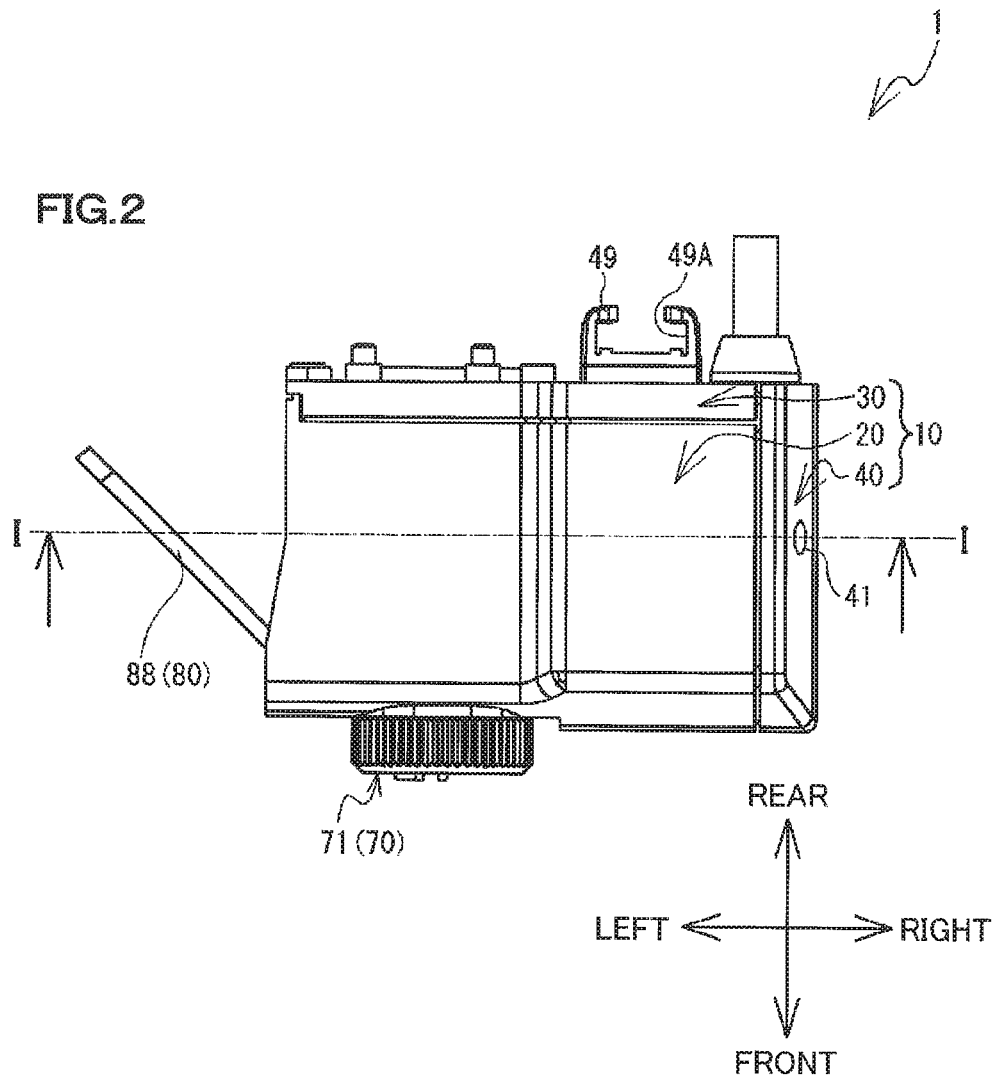
FIG. 2 is a plan view of the HMD 1.

As illustrated in FIG. 2, a to-be-held part 49 is provided in the rear face of the housing 10 opposite to the glasses-type frame 91. The to-be-held part 49 includes a groove 49A extending in the up and down directions. The downward extending part 98 (see FIG. 1) is fit into the groove 49A. A flat spring (not illustrated) is provided in the bottom part of the groove 49A. The flat spring is locked to any of tooth parts provided in the downward extending part 98. By virtue of this, positioning of the HMD 1 in the up and down directions is allowed to be achieved.

Figure 4:
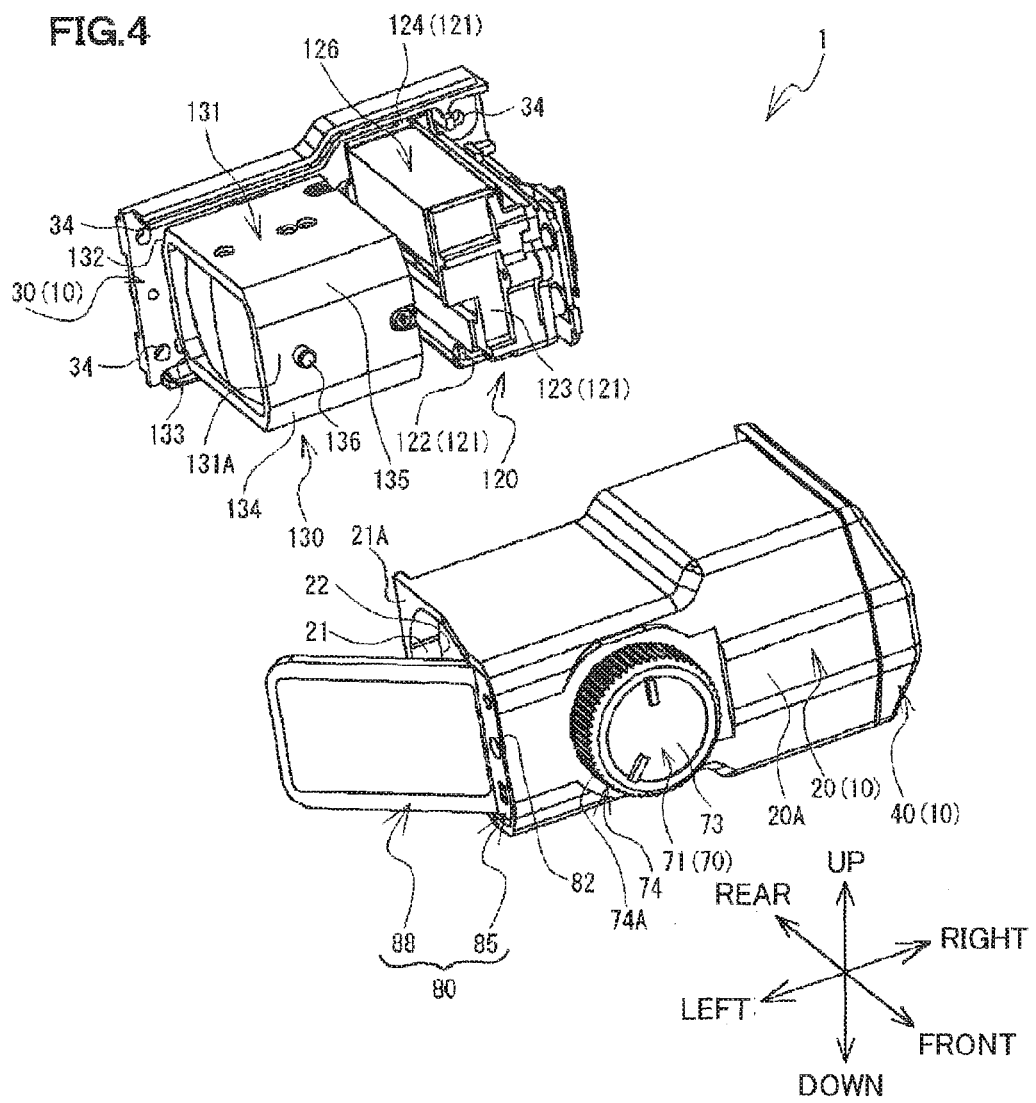
FIG. 4 is an exploded perspective view of the HMD 1 viewed from obliquely front left.

The housing 10 includes a first housing 20, a second housing 30, and a third housing 40. As illustrated in FIGS. 3 and 4, the first housing 20 has a hollow rectangular parallelepiped shape. The first housing 20 is provided with a left-side opening part 21, a right-side opening part 23, and a rear-side opening part 22. The second housing 30 is fixed to the rear wall part of the first housing 20 such as to close the rear-side opening part 22. The third housing 40 is fixed to the right wall part 23A of the first housing 20 such as to close the right-side opening part 23. An insertion hole 41

(see FIG. 1) is provided in each of the upper side and the lower side of the right side face of the third housing 40. When a screw 42 inserted into the upper-side insertion hole 41 from the right direction of the third housing 40 is tightened into a screw hole 23B, the upper portion of the third housing 40 is fixed to the first housing 20. When a screw (not illustrated) inserted into the lower-side insertion hole 41 from the right direction of the third housing 40 is tightened into a screw hole of the right wall part 23A, the lower portion of the third housing 40 is fixed to the first housing 20. Further, the half mirror 80 is fixed to the left wall part 21A of the first housing 20.

(2) Control Board 110, Liquid Crystal Display Unit 120, and Eyepiece Optical System 130

As illustrated in FIG. 3, the housing 10 contains a control board 110, a liquid crystal display unit 120, and an eyepiece optical system 130 in the order from right to left. The liquid crystal display unit 120 generates image light on the basis of image data received by the control board 110. The eyepiece optical system 130 includes a plurality of lenses (not illustrated). The plurality of lenses lead from right to left the image light generated by the liquid crystal display unit 120. The eyepiece optical system 130 is located on the right side of the half mirror 80. At least a part of the image light led by the eyepiece optical system 130 is reflected rearward by the half mirror 80. In the following description, the right and left directions are also referred to as a "first direction" and the frontward and rearward directions are also referred to as a "second direction". Further, in the following description, the direction of traveling of the image light reflected by the half mirror 80 (the direction in which the half mirror 80 reflects the image light) is also referred to as a "reflecting direction".

As illustrated in FIG. 4, the liquid crystal display unit 120 includes a liquid crystal display holder 121, a liquid crystal display 126, and a liquid crystal display board 127 (see FIG. 3). The liquid crystal display holder 121 includes a supporting wall part 122, a front-side wall part 123, and a rear-side wall part 124. The liquid crystal display 126 is held by the liquid crystal display holder 121. The liquid crystal display board 127 is a board performing the control of the liquid crystal display 126 and is fixed to the right side of the liquid crystal display 126. The liquid crystal display board 127 is connected through flexible printed circuits (FPCs) 128 (see FIG. 3) to the control board 110 (see FIG. 3). The rear-side wall part 124 is fixed to the second housing 30 by using a screw 34B (see FIG. 6).

(3) Eyepiece Optical System 130

Figure 5:
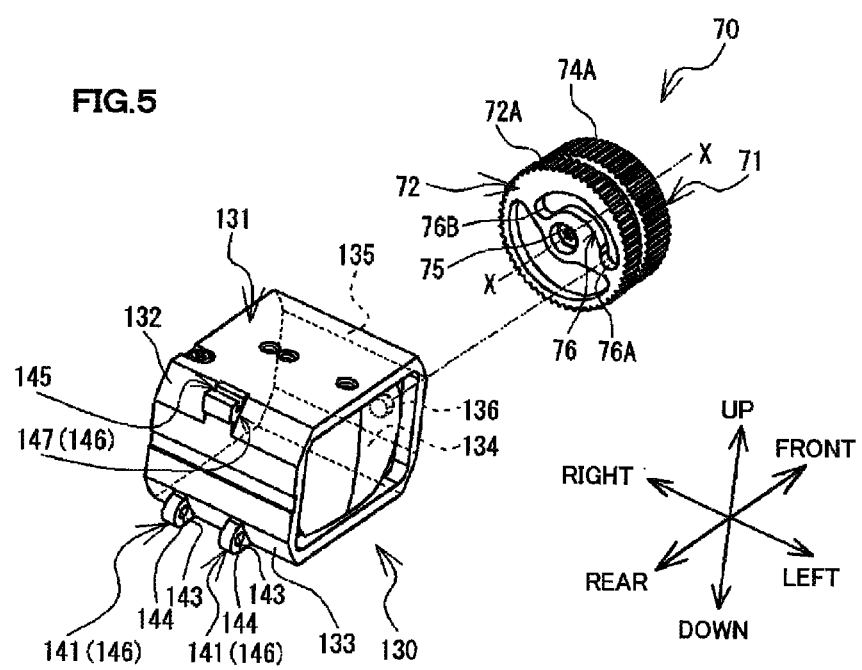
FIG. 5 is a perspective view of an eyepiece optical system 130 and an adjuster 70 viewed from obliquely rear left.

The eyepiece optical system 130 is supported by the second housing 30 in a manner of permitting reciprocating movement in the first direction. The eyepiece optical system 130 includes a lens holder 131. As illustrated in FIG. 5, the lens holder 131 is provided with inclined parts 132 to 135. The plurality of lenses (not illustrated) are fixed in the inner side of the lens holder 131. The individual optical axes of the plurality of lenses are arranged on an axis extending along the center of the lens holder 131 in the right and left directions.

As illustrated in FIG. 4, a protruding part 136 is provided in the front side face 131A of the lens holder 131. The protruding part 136 is inserted into a cam groove 76 (see FIG. 5) described later from the rear side.

(4) Half Mirror 80

The half mirror 80 is a plate-shaped member fixed to the front side part of the left-side opening part 21 within the left wall part 21A of the first housing 20. For example, the half mirror 80 may be formed from transparent resin such as acrylic and polycarbonate or from optical glass. The half mirror 80 includes a first plate-shaped part 85 and a second plate-shaped part 88. An insertion hole 82 of the first plate-shaped part 85 corresponds to a screw hole (not illustrated) provided in the left wall part 21A. A screw (not illustrated) inserted into the insertion hole 82 is tightened into a screw hole (not illustrated) provided in the left wall part 21A.

Figure 6:
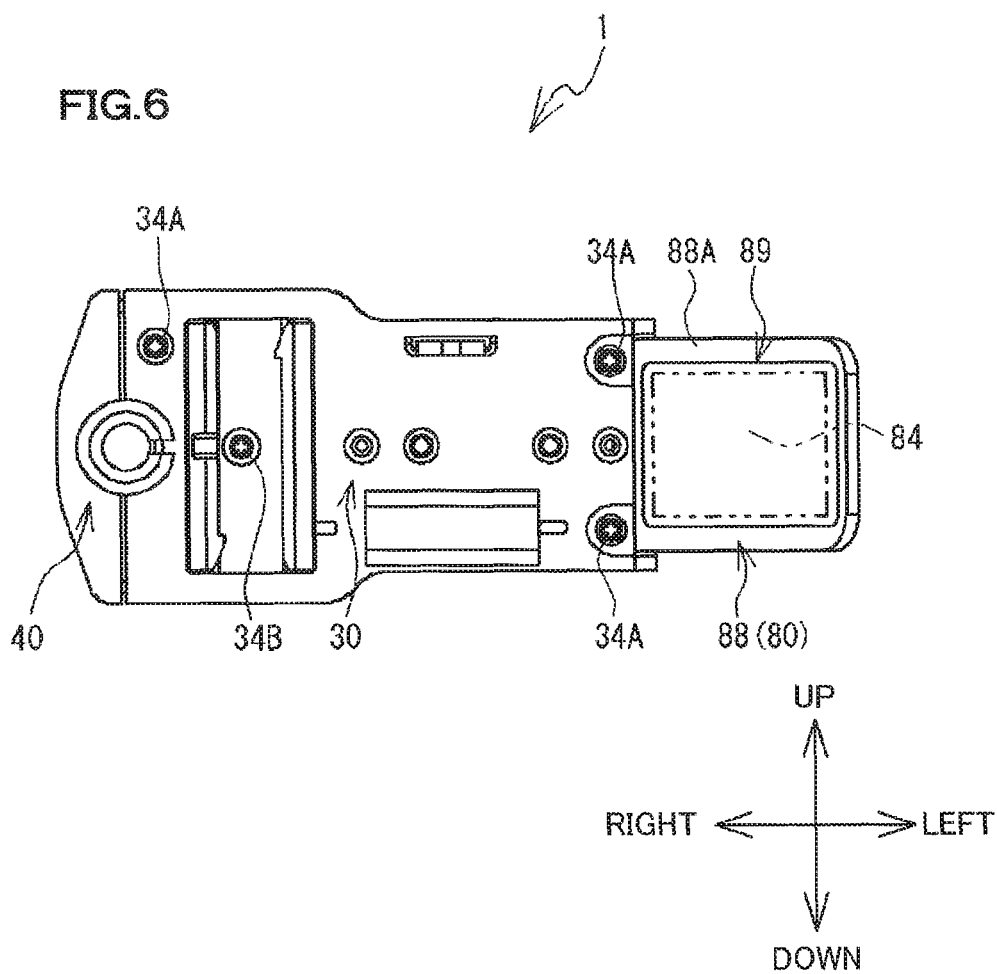
FIG. 6 is a rear view of the HMD 1.

As illustrated in FIG. 6, a face 88A on the rear side of the second plate-shaped part 88 is a face onto which the image light led by the eyepiece optical system 130 is projected. A reflecting surface 89 of the face 88A is a region reflecting toward the reflecting direction at least a part of the image light led by the eyepiece optical system 130. In place of the half mirror 80, a reflecting member including a mirror surface allowed to reflect the entire image light of the eyepiece optical system 130 may be provided in the first housing 20.

(5) Second Housing 30

Figure 7:
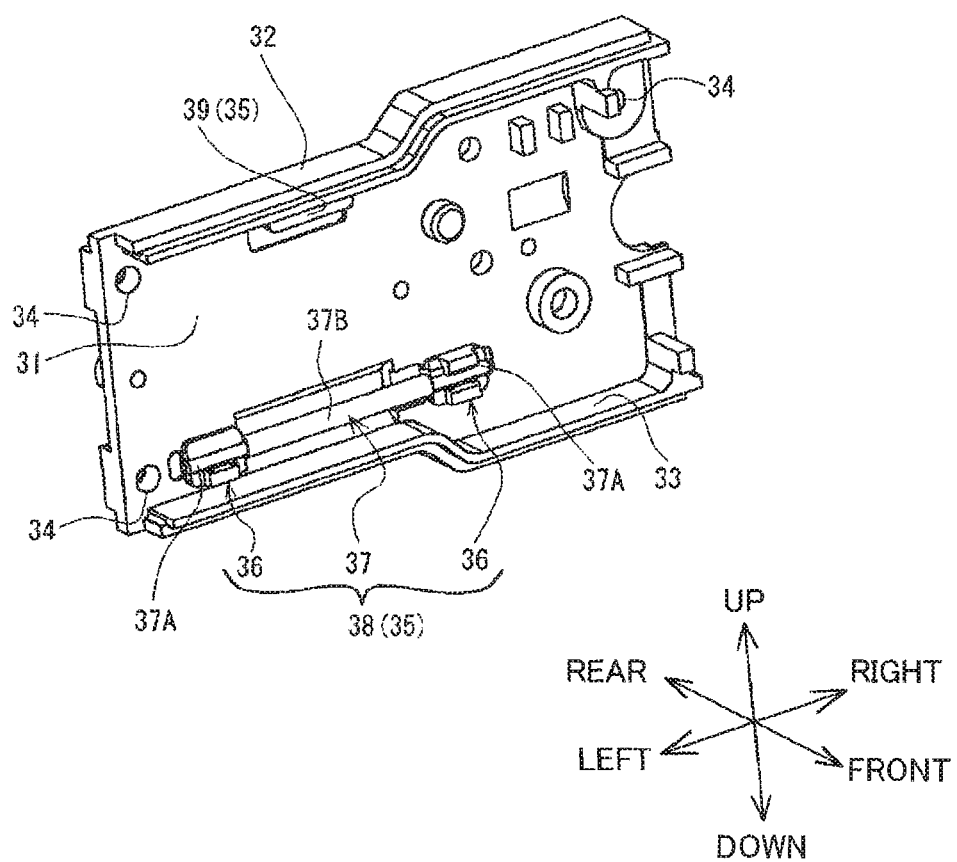
FIG. 7 is a perspective view of a second housing 30 viewed from obliquely front left.

With reference to FIG. 7, the configuration of the second housing 30 is described below. The second housing 30 is arranged on the reflecting direction side relative to the first housing 20. The second housing 30 includes a front wall part 31, an upper wall part 32, and a lower wall part 33. The second housing 30 is provided with three insertion holes 34 and a pair of guiding parts 35. When screws 34A (see FIG. 6) are inserted into the insertion holes 34 and then tightened into screw holes of the rear wall part of the first housing 20, the second housing 30 and the first housing 20 (seen FIG. 4) are fixed together. The three screws 34A are arranged on the reflecting direction side within the housing 10 (see FIG. 6).

One of the pair of guiding parts 35 includes a shaft part 38. The shaft part 38 is provided on the lower side in the front face of the front wall part 31. The shaft part 38 includes two shaft mounting parts 36 and a shaft member 37. The shaft member 37 includes two attaching parts 37A and a to-be-slid part 37B. The diameter of the attaching part 37A is smaller than the diameter of the to-be-slid part 37B and substantially equal to the separation distance between a pair of wall parts each forming the shaft mounting part 36. When the attaching parts 37A are fit into the shaft mounting parts 36 from the front side, the shaft member 37 is attached to the shaft mounting parts 36 in an attachable and detachable manner.

The other one of the pair of guiding parts 35 includes a protruding part 39. The protruding part 39 protrudes downward from the lower face of the upper wall part 32.

(6) Pair of Sliding Parts 146

With reference to FIG. 5, a pair of sliding parts 146 is described below. The pair of sliding parts 146 are protruding parts protruding rearward from the rear side of the lens holder 131. The pair of sliding parts 146 individually slide along the pair of guiding parts 35 (see FIG. 7) so that a sliding property is achieved. One of the pair of sliding parts 146 includes two shaft insertion parts 141. Each shaft insertion part 141 includes a rear side protruding part 143 and a hole 144. The holes 144 provided in the two shaft insertion parts 141 are separated from each other in the first direction. The inner diameter of the hole 144 is slightly larger than the diameter of the to-be-slid part 37B.

The other one of the pair of sliding parts 146 includes an upward upright part 147. The upward upright part 147 is provided substantially in the center in the right and left of the inclined part 132. The upward upright part 147 is arranged at a position located between the two shaft insertion parts 141 in the first direction. The upward upright part 147 is formed by a pair of wall parts separated from each other in the frontward and rearward directions and opposite to each other. The upward upright part 147 includes a groove 145. The groove width of the groove 145 is slightly larger than the thickness of the protruding part 39 (see FIG. 7).

The method of mounting the eyepiece optical system 130 to the second housing 30 is described below. The shaft member 37 (see FIG. 7) removed from the attaching parts 37A (see FIG. 7) is inserted into the two holes 144. After the protruding part 39 (see FIG. 7) is fit into the groove 145, the two attaching parts 37A are attached to the shaft mounting parts 36 (see FIG. 7) corresponding individually. As a result, the protruding part 39 becomes slidable along the groove 145. Further, the two shaft insertion parts 141 become slidable along the to-be-slid part 37B. By virtue of this, the eyepiece optical system 130 is supported by the second housing 30 in a manner of permitting reciprocating movement along the first direction. In the following description, within the movable range of the eyepiece optical system 130, a position that the eyepiece optical system 130 is located on the leftmost side is referred to as a left end position (see FIG. 8A) and a position that the eyepiece optical system 130 is located on the rightmost side is referred to as a right end position (see FIG. 8B).

The left end position is a position that the eyepiece optical system 130 is located closest to the half mirror 80 (see FIG. 6). Thus, the region on the face 88A (see FIG. 6) onto which the light led by the eyepiece optical system 130 is projected becomes the largest when the eyepiece optical system 130 is located at the left end position. In the following description, this region is referred to as a maximum projection region 84 (see FIG. 6). As illustrated in FIG. 6, the maximum projection region 84 is located in the inner side of the reflecting surface 89. That is, the reflecting surface 89 contains the maximum projection region 84.

(7) Adjuster 70

With reference to FIGS. 4 and 5, the adjuster 70 is described below. The adjuster 70 is a member having a circular shape in front view. The adjuster 70 is constructed such as to be rotatable about an axis X (see FIG. 5) extending in the frontward and rearward directions. When the adjuster 70 rotates, the eyepiece optical system 130 performs reciprocating movement so that focus adjustment of the HMD 1 is achieved.

The adjuster 70 includes a first rotating member 71 and a second rotating member 72. The first rotating member 71 is a member used when the user rotates the adjuster 70. The first rotating member 71 is in the shape of a lid having a substantially circular shape in front view. The first rotating member 71 includes a front wall part 73 and a peripheral wall part 74. The front wall part 73 is a plate-shaped member having a substantially circular shape in front view. The peripheral wall part 74 extends rearward from the peripheral part of the front wall part. In the outer peripheral surface of the peripheral wall part 74, a depression-protrusion part 74A is provided over the circumferential direction of the peripheral wall part 74. At the time that the user pinches the outer peripheral surface of the peripheral wall part 74 with fingers (not illustrated) and then rotates the first rotating member 71, the depression-protrusion part 74A prevents the fingers from slipping from the peripheral wall part 74.

The second rotating member 72 is a plate-shaped member having a substantially circular shape in front view. The second rotating member 72 is located on the rear side of the first rotating member 71 with the front wall part 20A in between. The second rotating member 72 is arranged coaxial to the first rotating member 71. A screw member 75 is provided in the center part of the second rotating member 72. The screw member 75 passes a through hole (not illustrated) penetrating the front wall part 20A of the first housing 20 in the inner side of the attaching part, and then is tightened to the center part of the first rotating member 71. By virtue of this, the first rotating member 71 and the second rotating member 72 rotate integrally. In the outer peripheral surface of the second rotating member 72, a depression-protrusion part 72A is provided over the circumferential direction. Any one piece in the depression-protrusion part 72A is locked to a flat spring (not illustrated) provided in the inside of the housing 10.

A cam groove 76 is provided in the rear side face of the second rotating member 72. The cam groove 76 is a groove formed such that a part of the rear side face of the second rotating member 72 is made concave frontward. The cam groove 76 extends spirally about the axis X of the adjuster 70. The cam groove 76 extends such as to depart from the axis X of the adjuster 70 as proceeding toward the clockwise direction in rear view (see FIG. 9A). The cam groove 76 has a starting end 76A and a termination end 76B.

The cam groove 76 in the present embodiment is formed in the rear side face of the second rotating member 72 such that the angle range is approximately 170 degrees.

The protruding part 136 (see FIG. 4) is inserted into the inner side of the cam groove 76 from the rear side. When the second rotating member 72 rotates, the protruding part 136 performs reciprocating movement in the first direction by virtue of the inner side wall surface of the cam groove 76 so that the eyepiece optical system 130 is allowed to perform reciprocating movement in the first direction. When the protruding part 136 abuts against the starting end 76A, the eyepiece optical system 130 is located at the left end position. Further, when the protruding part 136 abuts against the termination end 76B, the eyepiece optical system 130 is located at the right end position.

(8) Focus Adjustment

Figure 9A:
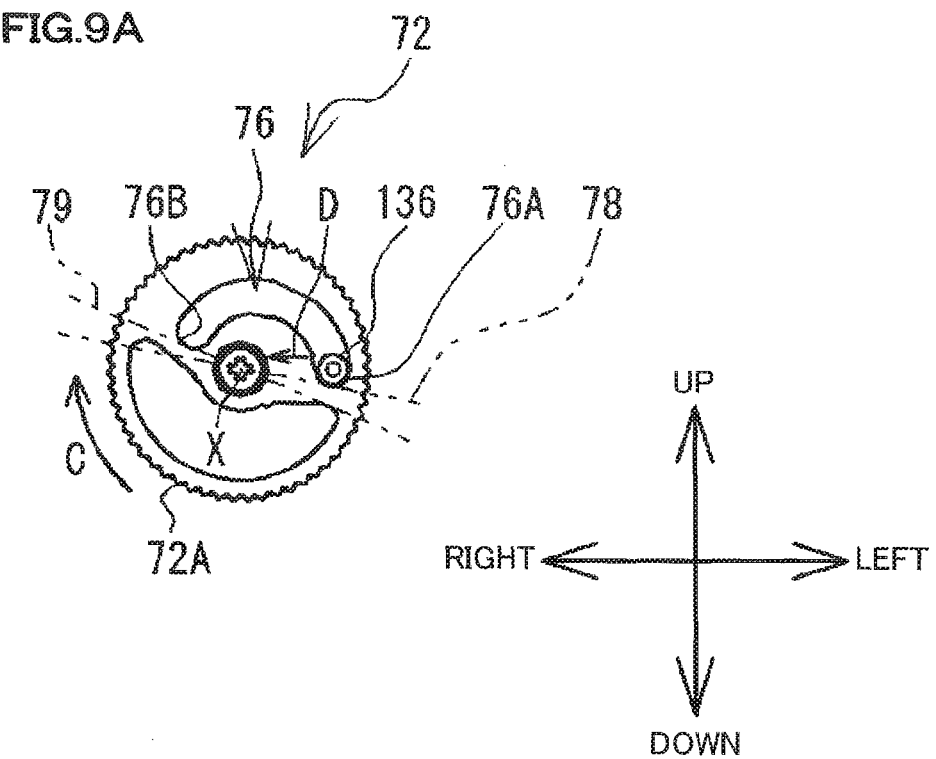
FIG. 9A is a diagram illustrating the positional relation between a cam groove 76 and a protruding part 136 in a state that the eyepiece optical system 130 is arranged on the leftmost side.

Next, with reference to FIGS. 8A, 8B, 9A, and 9B, the method of focus adjustment is described below. Here, in the following description, it is premised that the eyepiece optical system 130 is located at the left end position before focus adjustment. As illustrated in FIGS. 8A and 9A, the user pinches the depression-protrusion part 74A with fingers (not illustrated) and then rotate the depression-protrusion part 74A counterclockwise in front view (the direction of arrow A in FIG. 8A and the direction of arrow C in FIG. 9A). In this case, in association with the rotation of the second rotating member 72, the cam groove 76 also rotates. In association with the rotation, the outer side wall surface of the cam groove 76 moves the abutting protruding part 136 rightward (the direction of arrow B in FIG. 8A and the direction of arrow D in FIG. 9A). In association with the movement of the protruding part 136, the upward upright part 147 (see FIG. 5) slides and moves rightward along the protruding part 39 (see FIG. 7). Further, the two shaft insertion parts 141 (see FIG. 5) slide and move rightward along the to-be-slid part 37B (see FIG. 7). In this case, the groove 145 (see FIG. 5) of the upward upright part 147 prevents the eyepiece optical system 130 from rotating about the axis of the two holes 144.

Figure 9B:
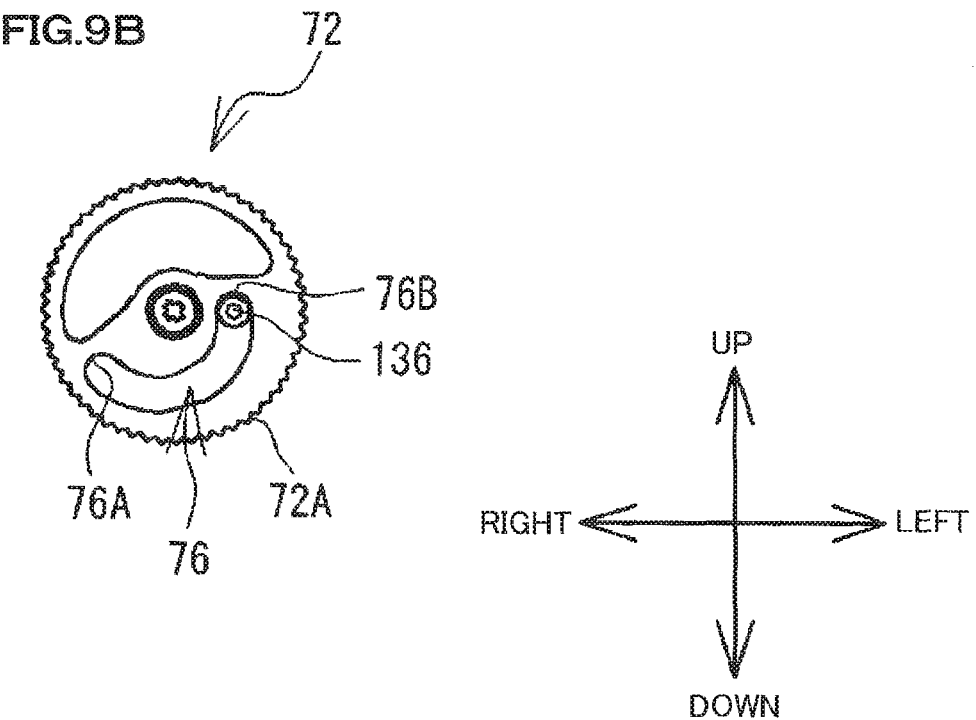
FIG. 9B is a diagram illustrating the positional relation between the cam groove 76 and the protruding part 136 in a state that the eyepiece optical system 130 is arranged on the rightmost side.

As illustrated in FIGS. 8B and 9B, when the second rotating member 72 has rotated counterclockwise in front view by approximately 170 degrees, the termination end 76B abuts against the protruding part 136. In this case, the eyepiece optical system 130 moves to the right end position. Even when the eyepiece optical system 130 is to be moved from the left end position to the right end position, it is sufficient that the user rotates the adjuster 70 by approximately 170 degrees.

As such, when the adjuster 70 is rotated, the eyepiece optical system 130 performs relative movement in the first direction along the pair of guiding parts 35 relative to the half mirror 80 and the liquid crystal display unit 120. The amount of movement of the eyepiece optical system 130 is allowed to be adjusted in accordance with the amount of rotation of the adjuster 70. Thus, focus adjustment is allowed in the HMD 1. Here, in the course that the second rotating member 72 rotates, the portion of the depression-protrusion part 72A to which the flat spring (not illustrated) provided in the housing 10 is locked varies successively. Thus, in the HMD 1, the user is allowed to reliably recognize the situation that the adjuster 70 rotates.

Further, the first rotating member 71 is provided in the front face of the front wall part 20A of the first housing 20. By virtue of this, even in a case that the HMD 1 having been provided on the right end side in the upper face of the center frame part 94 (see FIG. 1) is provided on the left end side in the upper face of the center frame part 94 in a state that up, down, right, and left are inverted, the first rotating member 71 remains located on the front side of the first housing 20. Thus, regardless of whether the position where the HMD 1 is provided is the right side or the left side of the center frame part 94, the user who performs focus adjustment is allowed to touch the first rotating member 71 without question. Accordingly, in the HMD 1, the operability of focus adjustment is allowed to be improved.

The liquid crystal display 126 remains fixed to the second housing 30. Thus, a situation does not occur that the liquid crystal display 126 performs reciprocating movement in the first direction in association with focus adjustment and thereby a load preventing the movement is received from the FPCs or the like. Thus, the liquid crystal display 126 generating the image light is hardly inclined in the first direction. Accordingly, in the HMD 1, even at the time that focus adjustment is performed, the image visually recognized by the user is hardly deformed.

Further, when the pair of sliding parts 146 slide along the pair of guiding parts 35, the eyepiece optical system 130 moves in the first direction. Since the pair of guiding parts 35 guide the eyepiece optical system 130 along the first direction, the eyepiece optical system 130 easily performs reciprocating movement and is hardly inclined in the first direction.

Further, the screws 34A fixing together the first housing 20 and the second housing 30 are arranged in a portion on the reflecting direction side within the housing 10. At the time of use of the HMD 1, the screws 34A are hardly recognized visually from viewpoints other than the user's one. Thus, in the HMD 1, satisfactory external appearance is obtained.

Further, when operation that the shaft member 37 is inserted into the hole 144, then the protruding part 39 is fit into the groove 145, and then the shaft member 37 is attached to the shaft mounting parts 36 is merely performed, the eyepiece optical system 130 is allowed to perform reciprocating movement along the first direction. This improves the assembling property of the HMD 1.

The upward upright part 147 is arranged at a position located between the two shaft insertion parts 141 in the first direction. The upward upright part 147 is allowed to stably prevent the eyepiece optical system 130 from rotating about the axis of the two holes. Thus, in the HMD 1, the reciprocating movement of the eyepiece optical system 130 is allowed to be further stabilized.

Further, when the adjuster 70 is rotated, the cam groove 76 causes the protruding part 136 to perform reciprocating movement along the first direction so that the eyepiece optical system 130 is allowed to perform reciprocating movement. By merely rotating the adjuster 70, the user is allowed to cause the eyepiece optical system 130 to perform reciprocating movement. Thus, in the HMD 1, operability at the time of focus adjustment is allowed to be improved.

Further, within the angles formed by a plane 78 (see FIG. 9A) containing the starting end 76A and the axis X and a plane 79 (see FIG. 9A) containing the termination end 76B and the axis X, the angle (referred to as a first angle, hereinafter) (approximately 170 degrees) on the cam groove 76 side is 90 degrees or greater and 180 degrees or smaller. When the angle range where the cam groove 76 is formed is smaller than 90 degrees (the first angle is smaller than 90 degrees), in order that the eyepiece optical system 130 may perform reciprocating movement by the same amount of movement as that in the present embodiment, an increase is to be caused in the amount of movement that the eyepiece optical system 130 moves along the first direction per unit amount of rotation of the adjuster 70. When the angle range where the cam groove 76 is formed is 90 degrees or greater, the amount of movement that the eyepiece optical system 130 moves along the first direction per unit amount of rotation of the adjuster 70 is suppressed. Further, when the first angle is 180 degrees or smaller, at the time of focus adjustment, the user is not required to redo pinching of the adjuster 70 with fingers. Thus, when the first angle is 90 degrees or greater and 180 degrees or smaller, the user is allowed to perform fine adjustment of the eyepiece optical system 130 without the necessity of redoing pinching of the adjuster 70 with fingers. Thus, in the HMD 1, the operability of focus adjustment is allowed to be further improved.

Further, the reflecting surface 89 contains the maximum projection region 84. Thus, regardless of the position of the reciprocating movement, the image light projected onto the face 88A by the eyepiece optical system 130 does not fall outside the reflecting surface 89. Thus, in the HMD 1, regardless of the position of the eyepiece optical system 130, the user is allowed to stably recognize visually the image of the image light.

Further, in a state that the user is equipped with the HMD 1, the protruding part 136, the pair of sliding parts 146, the pair of guiding parts 35, and the cam groove 76 are arranged in the frontward and rearward directions relative to the user and not arranged in the up and down directions. Thus, in the HMD 1, in a state of being equipped in the user, the size in the up and down directions is allowed to be suppressed. Thus, a possibility is reduced that the user's field of view is blocked by the housing 10. Accordingly, in the HMD 1, in a state of being equipped in the user, the user's field of view is allowed to be satisfactorily maintained.

Second Embodiment

Figure 10:
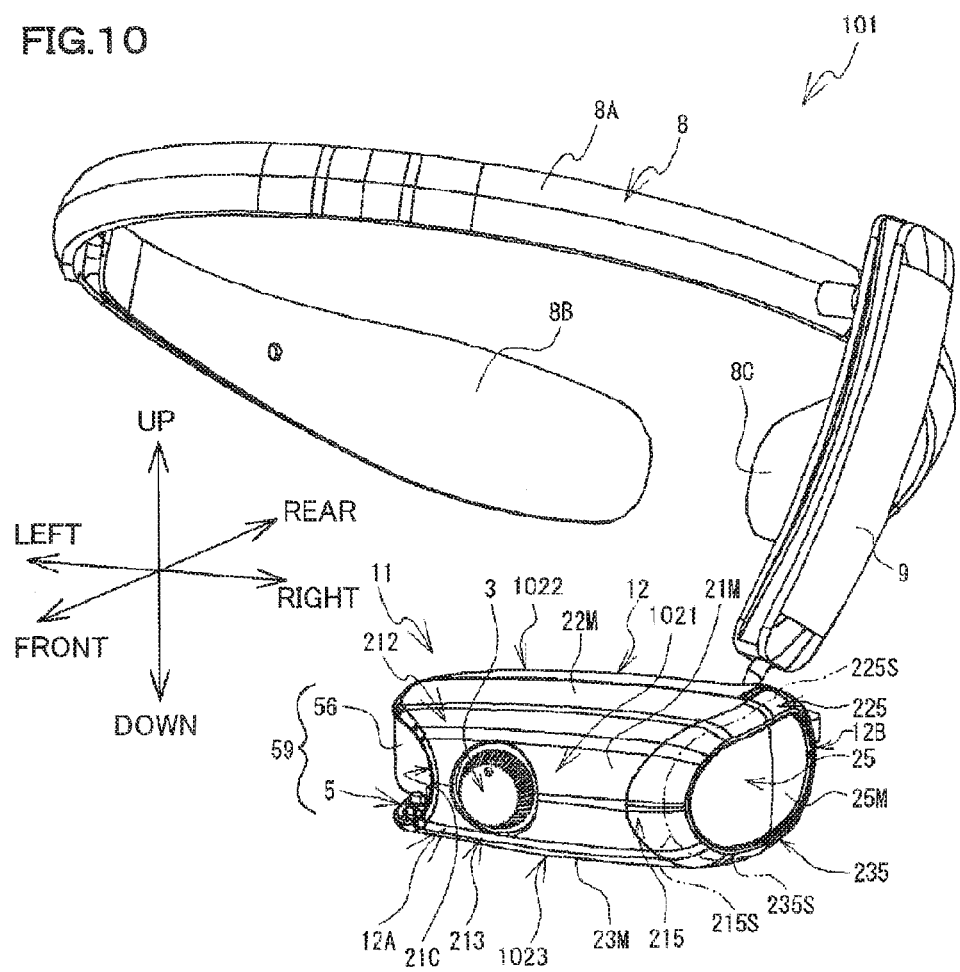
FIG. 10 is a perspective view of an HMD 101.

Next, another embodiment of the present disclosure is described below with reference to the drawings. As illustrated in FIG. 10, an HMD 101 is a see-through HMD of optically transmissive type. Light of a scene in front of the user is transmitted through a half mirror 56 and then led directly to the user's eye. The type of projection of the HMD 101 is of a virtual-image projection type. The half mirror 56 reflects the light of an image displayed on a liquid crystal panel 72B (see FIG. 15, described later), toward user's one eye. The HMD 101 is allowed to cause the user to recognize the scene in front of the user and the image in an overlaid manner with each other. The HMD 101 includes a body member 11, a mounting member 8, and a connecting member 9. Here, for the purpose of helping the understanding of description of the figures, definitions are given for the upper side, the lower side, the left side, the right side, the front side, and the rear side of the HMD 101. For example, the upper side, the lower side, the left side, the right side, the front side, and the rear side of the HMD 101 correspond respectively to the upper side, the lower side, the left side, the right side, the obliquely downward left side, and the obliquely upward right side in FIG. 10. The upper side, the lower side, the left side, the right side, the front side, and the rear side of the HMD 101 correspond to respective directions in a state that the user is equipped with the mounting member 8.

<Mounting Fixture 8, Connecting Member 9, and Body Member 11>

The mounting member 8 is made of a material having flexibility like resin and metal (e.g., stainless steel). The mounting member 8 includes a first portion 8A and second portions 8B and 8C. Each of the first portion 8A and the second portions 8B and 8C is a curved and elongated plate-shaped member. The first portion 8A extends in the right and left directions and is curved convex frontward. The second portion 8B extends from an end part on one side (e.g., the left side) of the first portion 8A. The second portion 8C extends from an end part on the other side (e.g., the right side) of the first portion 8A. The second portions 8B and 8C individually extend such that the end parts on the side (e.g., the rear side) opposite to the side connected to the first portion 8A become close to each other. The mounting member 8 is attached to the user's head in a manner that the first portion 8A and the second portions 8B and 8C are respectively in contact with the front part, the right side, and the left side of the user's head. In this state, the first portion 8A extends in the right and left directions along the user's forehead.

The connecting member 9 has a rod shape. The connecting member 9 is made of resin, metal, or the like. One end side (e.g., the upper side) of the connecting member 9 is connected to a vicinity of a portion connected to the second portion 8C within the first portion 8A of the mounting member 8. The connecting member 9 and the mounting member 8 are connected together by using a ball joint. The other end side (e.g., the lower side) of the connecting member 9 is connected to a body member 11 described later. The connecting member 9 and the body member 11 are connected together by using a ball joint. The connecting member 9 holds the body member 11 at a position separated from the mounting member 8. In a state that the mounting member 8 is attached to the user's head, the connecting member 9 is allowed to cause the half mirror 56 of the body member 11 to be arranged in front of the user's left eye.

Figure 11:
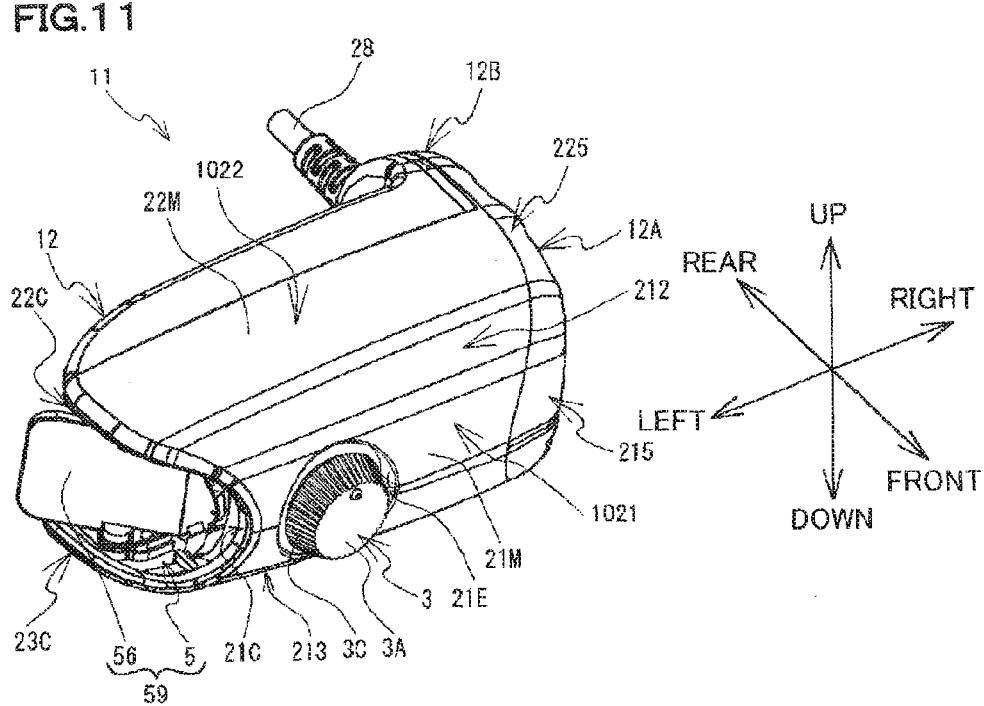
FIG. 11 is a perspective view of a body member 11.
Figure 12:
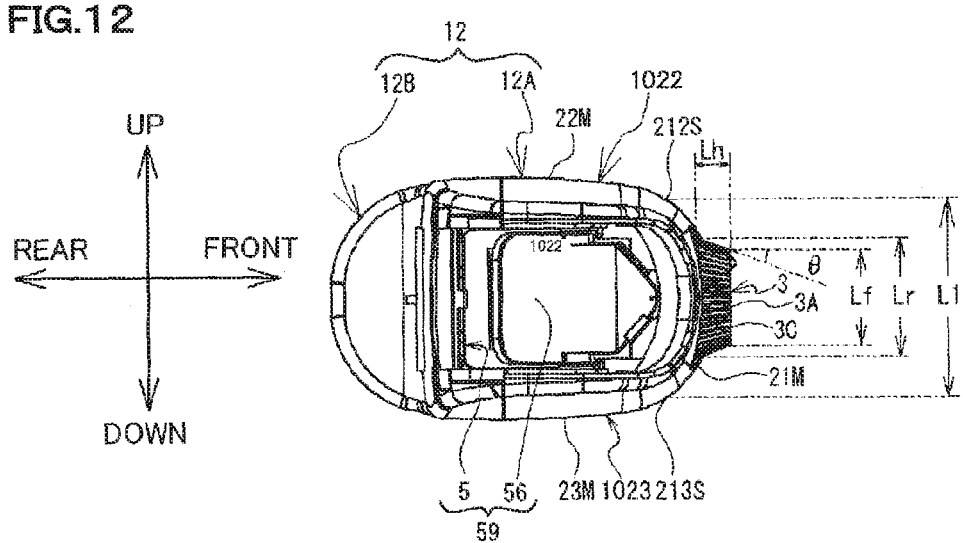
FIG. 12 is a left side view of the body member 11.
Figure 15:
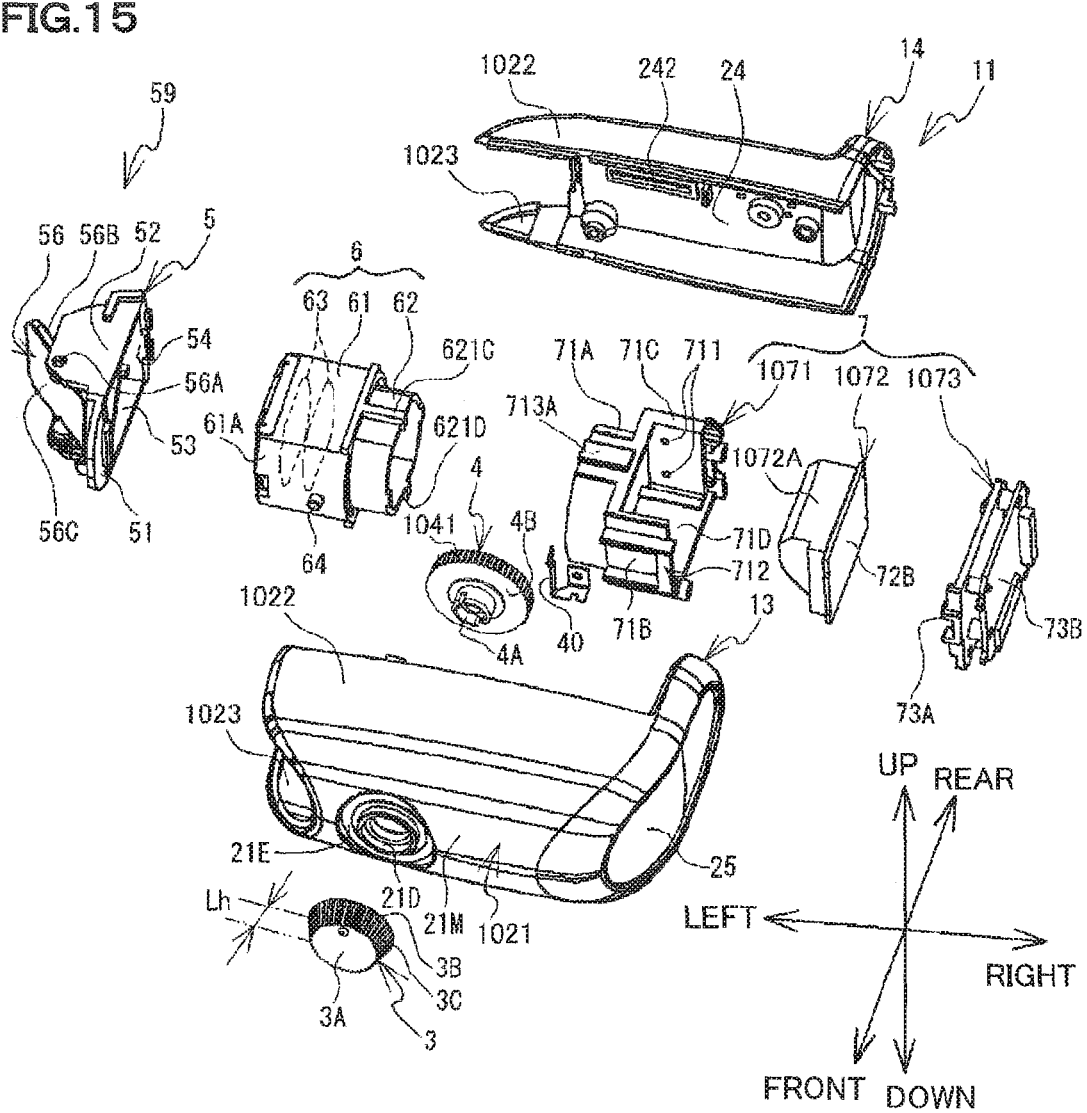
FIG. 15 is an exploded perspective view of the body member 11.

As illustrated in FIGS. 10, 11, and 12, the body member 11 includes a housing 12, an operating member 3, an adjustment mechanism 4 (see FIG. 15), a deflection unit 59, a lens unit 6 (see FIG. 15), and an image unit 7 (see FIG. 15). The deflection unit 59 includes a holder 5 and a half mirror 56.

<Housing 12>

Figure 13:
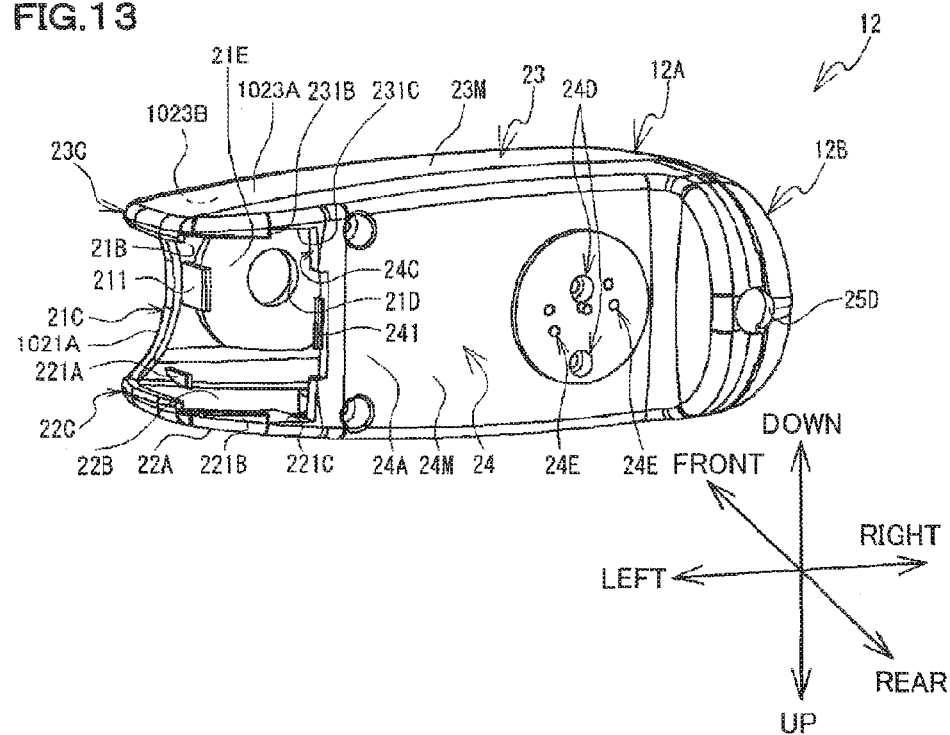
FIG. 13 is a perspective view of a housing 12.

As illustrated in FIGS. 10, 11, and 13, the housing 12 includes a body part 12A and a protruding part 12B. The housing 12 is an example of a support member. The body part 12A has a substantially rectangular parallelepiped shape whose edges are curved. The protruding part 12B protrudes rearward from the rear right side of the body part 12A. The housing 12 has a hollow box shape. The front side, the upper side, the lower side, the rear side, and the right side of the body part 12A are respectively referred to as a first housing 1021, a second housing 1022, a third housing 1023 (see FIG. 10), a fourth housing 24 (see FIG. 13), and a fifth housing 25 (see FIG. 10). The front side face of the first housing 1021, the upper side face of the second housing 1022, the lower side face of the third housing 1023, the rear side face of the fourth housing 24, and the right side face of the fifth housing 25 are respectively referred to as a first surface 21M, a second surface 22M, a third surface 23M, a fourth surface 24M (see FIG. 13), and a fifth surface 25M (see FIG. 10). Here, the left side of the housing 12 is opened so that the left side of the lens unit 6 (described later) in the housing 12 is exposed. The left side of the lens unit 6 is not covered by the housing 12.

As illustrated in FIGS. 10 and 11, a vicinity (referred to as a curved portion 212, hereinafter) of a portion where the first surface 21M and the second surface 22M are connected together and a vicinity (referred to as a curved portion 213, hereinafter) of a portion where the first surface 21M and the third surface 23M are connected together are individually curved. As illustrated in FIG. 10, a vicinity (referred to as a curved portion 215, hereinafter) of a portion where the first surface 21M and the fifth surface 25M are connected together, a vicinity (referred to as a curved portion 225, hereinafter) of a portion where the second surface 22M and the fifth surface 25M are connected together, and a vicinity (referred to as a curved portion 235, hereinafter) of a portion where the third surface 23M and the fifth surface 25M are connected together are individually curved.

By virtue of such a configuration, in the course that the user brings the remaining finger close to the operating member from the second face (the second surface) or the third face (the third surface), a situation is allowed to be suppressed that the remaining finger is caught in the edges of the housing. Thus, the user is allowed to smoothly operate the operating member.

Here, in the following description, a position whose tangent line is inclined at 45 degrees relative to the horizontal direction within the curved portion 212 is defined as a connection position 212S (see FIG. 12). The connection position 212S is a position where the first surface 21M and the second surface 22M are connected together. The connection position 212S is also a position where the first housing 1021 and the second housing 1022 are connected together. A position whose tangent line is inclined at 45 degrees relative to the horizontal direction within the curved portion 213 is defined as a connection position 213S (see FIG. 12). The connection position 213S is a position where the first surface 21M and the third surface 23M are connected together. The connection position 213S is also a position where the first housing 1021 and the third housing 1023 are connected together. A position whose tangent line is inclined at 45 degrees relative to the horizontal direction within the curved portion 215 is defined as a connection position 215S. The connection position 215S is a position where the first surface 21M and the fifth surface 25M are connected together. The connection position 215S is also a position where the first housing 1021 and the fifth housing 25 are connected together. A position whose tangent line is inclined at 45 degrees relative to the horizontal direction within the curved portion 225 is defined as a connection position 225S. The connection position 225S is a position where the second surface 22M and the fifth surface 25M are connected together. The connection position 225S is also a position where the second housing 1022 and the fifth housing 25 are connected together. A position whose tangent line is inclined at 45 degrees relative to the horizontal direction within the curved portion 235 is defined as a connection position 235S. The connection position 235S is a position where the third surface 23M and the fifth surface 25M are connected together. The connection position 235S is also a position where the third housing 1023 and the fifth housing 25 are connected together.

The second surface 22M is inclined obliquely downward from the rear side to the front side. The third surface 23M is inclined obliquely upward from the rear side to the front side. Thus, the distance in the up and down directions between the second surface 22M and the third surface 23M becomes gradually small as proceeding from the rear side to the front side. Accordingly, the length in the up and down directions of the fifth surface 25M, in other words, the length in the up and down directions between the connection position 225S and the connection position 235S, also becomes gradually small as proceeding from the rear side to the front side.

By virtue of such a configuration, in the HMD 1, the index or middle finger brought into contact with the second face (the second surface) in order that the user may hold the housing is allowed to be naturally inclined toward one side in the second direction (the frontward and rearward directions). In this case, for the user, the remaining finger is allowed to be more easily inclined in the second direction. Thus, for the user, a force is allowed to be more easily applied from the remaining finger to the operating member and hence the operating member is allowed to be more easily operated.

As illustrated in FIG. 11, the left end 21C of the first housing 1021 is concave rightward from both end parts in the up and down directions toward the center in the up and down directions. The left end 21C forms a substantial arc shape. The position on the rightmost side of the left end 21C is arranged on the right side relative to the position on the leftmost side of each of the left end 22C of the second housing 1022 and the left end 23C of the third housing 1023. As illustrated in FIG. 13, the position on the leftmost side of the left end 24C of the fourth housing 24 is arranged on the right side relative to the position on the leftmost side of each of the left ends 21C, 22C, and 23C.

In the following description, in each of the first housing 1021, the second housing 1022, the third housing 1023, and the fourth housing 24, a portion located on the left side relative to a lens unit 6 (see FIG. 15) described later is referred to as a first extending part 1021A, a second extending part 22A, a third extending part 1023A, or a fourth extending part 24A. The first extending part 1021A corresponds to a portion extending between the left end of the lens unit 6 and the left end 21C. The second extending part 22A corresponds to a portion extending between the left end of the lens unit 6 and the left end 22C. The third extending part 1023A corresponds to a portion extending between the left end of the lens unit 6 and the left end 23C. The fourth extending part 24A corresponds to a portion extending between the left end of the lens unit 6 and the left end 24C. The upper side of the first extending part 1021A is connected to the front side of the second extending part 22A. The lower side of the first extending part 1021A is connected to the front side of the third extending part 1023A. The rear side face of the first extending part 1021A, the lower side face of the second extending part 22A, and the upper side face of the third extending part 1023A are respectively referred to as a first back face 21B, a second back face 22B, and a third back face 1023B. The second back face 22B and the third back face 1023B are opposite to each other.

Figure 14:
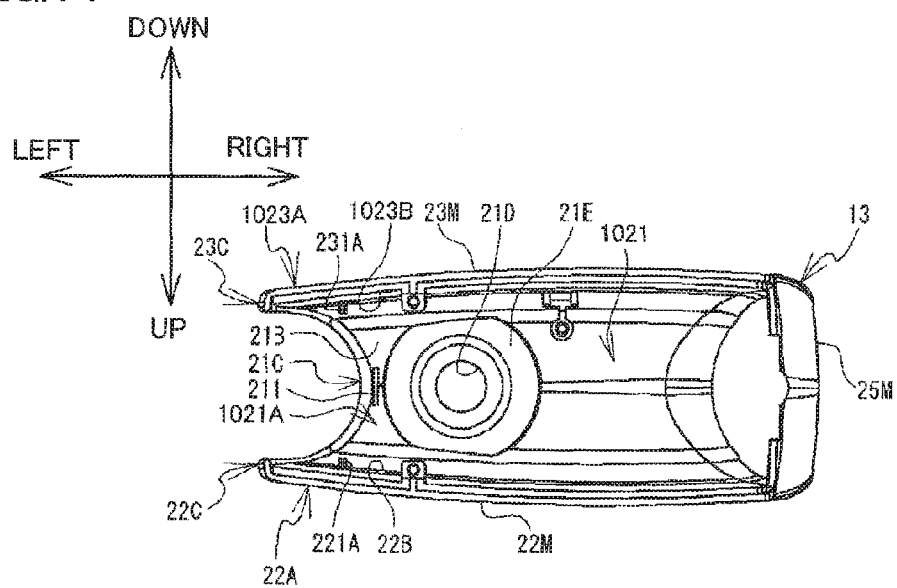
FIG. 14 is a view of a front side housing 13 viewed from the rear side.

As illustrated in FIGS. 13 and 14, a front-side first restriction member 221A is provided on the front side of the second back face 22B. The front-side first restriction member 221A is a plate-shaped member extending downward from the inner side of the curved portion 212 (see FIG. 10) within the second back face 22B. As illustrated in FIG. 14, a front-side first restriction member 231A is provided on the front side of the third back face 1023B. The front-side first restriction member 231A is a plate-shaped member extending upward from the inner side of the curved portion 213 (see FIG. 10) within the third back face 1023B. The two faces of each of the front-side first restriction members 221A and 231A are directed to the right and left directions. The positions in the right and left directions of the front-side first restriction members 221A and 231A are identical to each other.

As illustrated in FIG. 13, a rear-side first restriction member 221B is provided on the rear side of the second back face 22B. The rear-side first restriction member 221B is a plate-shaped member extending downward along the rear end of the second extending part 22A. A rear-side first restriction member 231B is provided on the rear side of the third back face 1023B. The rear-side first restriction member 231B is a plate-shaped member extending upward along the rear end of the third extending part 1023A. The two faces of each of the rear-side first restriction members 221B and 231B are directed to the frontward and rearward directions. The positions in the right and left directions of the front-side first restriction members 221A and 231A and the positions in the right and left directions of the right ends of the rear-side first restriction members 221B and 231B are substantially identical to each other. A groove 221C concave upward is formed by the right end of the rear-side first restriction member 221B, the upper end of the left end 24C of the fourth housing 24, and the second back face 22B. A groove 231C concave downward is formed by the right end of the rear-side first restriction member 231B, the lower end of the left end 24C of the fourth housing 24, and the third back face 1023B.

As illustrated in FIGS. 13 and 14, a hole 21D penetrating in the frontward and rearward directions is provided on the left side relative to the center in the up and down directions of the first housing 1021 and the center in the right and left directions of the housing 12. A protruding part 4A (see FIG. 15) of an adjustment mechanism 4 described later is fit into the hole 21D from the rear side. In the surroundings of the hole 21D of the first housing 1021, a recess 21E is provided that is concave rearward in a circular shape. An operating member 3 (see FIG. 15) described later is fit into the recess 21E from the front side. A second restriction member 211 is provided on the left side of the recess 21E in a vicinity of the left end 21C within the first back face 21B. The second restriction member 211 is a plate-shaped member extending rearward from a position containing the center in the up and down directions of the first back face 21B. For example, the second restriction member 211 is provided symmetric with respect to a plane that passes the center in the up and down directions of the first back face 21B and that is parallel to the frontward and rearward directions and the right and left directions. The two faces of the second restriction member 211 are directed to the right and left directions. As illustrated in FIG. 14, the second restriction member 211 is arranged on the right side relative to the position in the right and left directions of each of the front-side first restriction members 221A and 231A. As illustrated in FIG. 13, the second restriction member 211 is arranged on the right side relative to the position in the right and left directions of the right end of each of the rear-side first restriction members 221B and 231B. The length in the right and left directions from the right end of each of the front-side first restriction members 221A and 231A and the rear-side first restriction members 221B and 231B to the left end of the second restriction member 211 is equal to the length (the thickness) in the right and left directions of a first end part 51 (see FIG. 20) of a holder 5 (see FIG. 20) described later.

As illustrated in FIG. 13, a plurality of holes 24D penetrating in the frontward and rearward directions and a plurality of holes 24E are provided on the right side relative to the center in the right and left directions of the housing 12 within the fourth housing 24. The plurality of holes 24D are a plurality of screw holes used for attaching an image unit 7 described later to the housing 12, respectively. The plurality of holes 24E are a plurality of screw holes used for attaching the connecting member 9 to the housing 12, respectively. A hole 25D penetrating in the frontward and rearward directions is provided at the rear end of the protruding part 12B. A communication line 28 (see FIG. 11) is connected to the hole 25D. The HMD 101 is connected through the communication line 28 to an external device (not illustrated). The external device outputs image data to the HMD 101.

A housing engagement part 241 is provided in the fourth extending part 24A of the fourth housing 24, more specifically, at the left end 24C of the fourth housing 24. The housing engagement part 241 is a plate-shaped member extending leftward from a position containing the center in the up and down directions of the left end 24C of the fourth housing 24. For example, the housing engagement part 241 is provided symmetric with respect to a plane that passes the center in the up and down directions of the left end 24C and that is parallel to the frontward and rearward directions and the right and left directions.

As illustrated in FIG. 15, the housing 12 is formed by combining together a front side housing 13 and a rear side housing 14. The front side housing 13 includes the front side portions of the first housing 1021, the second housing 1022, and the third housing 1023 and includes the fifth housing 25. The rear side housing 14 includes the rear side portions of the second housing 1022 and the third housing 1023 and includes the fourth housing 24. The lens unit 6, the image unit 7, and an engagement part 4B of the adjustment mechanism 4 are arranged in the housing 12. The holder 5 is held at the left end of the housing 12. The holder 5, the lens unit 6, and the image unit 7 are aligned in the order from left to right. The adjustment mechanism 4 is arranged on the front side of the lens unit 6. A groove 242 concave rearward is provided at a position containing the center in the up and down directions within the front side face of the rear end part (the fourth housing 24) of the rear side housing 14, that is, within the inner side surface of the fourth housing 24. For example, the groove 242 is provided symmetric with respect to a plane that passes the center in the up and down directions of the inner side surface of the fourth housing 24 and that is parallel to the frontward and rearward directions and the right and left directions. The groove 242 extends in the form of a straight line in the right and left directions.

<Image Unit 7>

The image unit 7 generates and projects image light of an image corresponding to image data received from an external device through the communication line 28 (see FIG. 11). As illustrated in FIG. 15, the image unit 7 includes a first holding member 1071, a liquid crystal display 1072, and a second holding member 1073.

Figure 16:
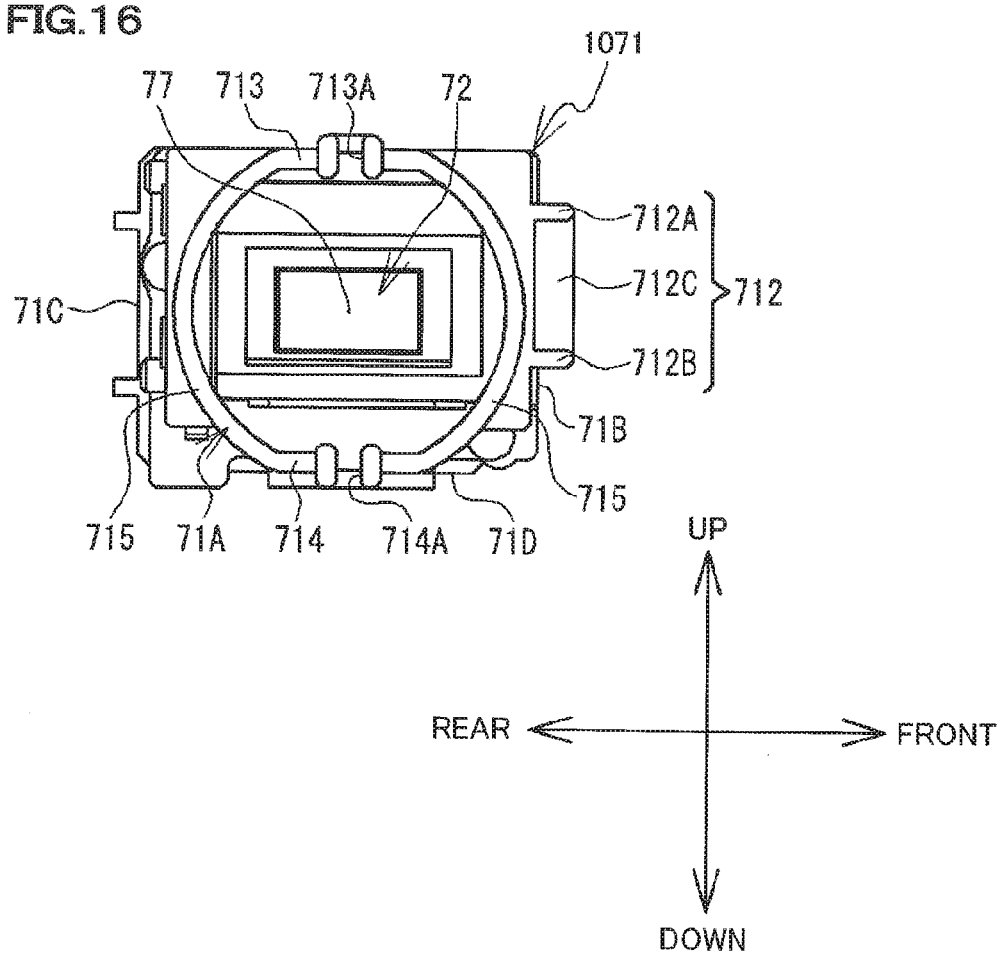
FIG. 16 is a left side view of an image unit 7.

The first holding member 1071 includes a cylinder member 71A and side plate members 71B, 71C, and 71D. The cylinder member 71A is an approximately cylinder-shaped member extending in the right and left directions. The individual optical axes 77 (see FIG. 16) of a plurality of lenses 63 described later are arranged on an axis extending in the right and left directions at the center of the cylinder member 71A. As illustrated in FIG. 16, each of the upper portion and the lower portion of the cylinder member 71A is not curved and extends along a plane perpendicular to the up and down directions. Hereinafter, the upper portion of the cylinder member 71A is referred to as a plane part 713. The lower portion of the cylinder member 71A is referred to as a plane part 714. The portion of the cylinder member 71A other than the plane parts 713 and 714, that is, the front side portion and the rear side portion of the cylinder member 71A, is referred to as a curved part 715. The length from the optical axis 77 to the plane parts 713 and 714 is shorter than or equal to the length from the optical axis 77 to the curved part 715. The length from the optical axis 77 to the plane parts 713 and 714 is the shortest at the center in the frontward and rearward directions of each of the plane parts 713 and 714. A groove 713A whose inner face is concave upward is provided at a position containing the center in the frontward and rearward directions of the plane part 713. For example, the groove 713A is provided symmetric with respect to a plane that passes the center in the frontward and rearward directions of the plane part 713 and that is parallel to the up and down directions and the right and left directions. A groove 714A whose inner face is concave downward is provided at a position containing the center in the frontward and rearward directions of the plane part 714. For example, the groove 714A is provided symmetric with respect to a plane that passes the center in the frontward and rearward directions of the plane part 714 and that is parallel to the up and down directions and the right and left directions. Each of the grooves 713A and 714A extends between both right and left end parts of the cylinder member 71A.

As illustrated in FIG. 15, each of the side plate members 71B, 71C, and 71D is a flat-plate shaped member extending rightward from the right end part of the cylinder member 71A. Among plural pairs of parallel planes of each of the side plate members 71B and 71C, a pair of planes having the largest area in each member are directed to the frontward and rearward directions. Among plural pairs of parallel planes of the side plate member 71D, a pair of planes having the largest area in the side plate member 71D are directed to the up and down directions. The lower end of the side plate member 71B is connected to the front end of the side plate member 71D. Further, the lower end of the side plate member 71C is connected to the rear end of the side plate member 71D. Screws inserted into the plurality of holes 24D (see FIG. 13) are tightened into screw holes 711 provided in the side plate member 71C. By virtue of this, the image unit 7 is held by the rear side housing 14 within the housing 12 so that the position relative to the housing 12 is fixed.

As illustrated in FIG. 16, the image unit 7 includes protruding parts 712A, 712B, and 712C protruding frontward from the side plate member 71B. The protruding parts 712A, 712B, and 712C have plate shapes. The protruding parts 712A and 712B extend in parallel to the right and left directions. The protruding part 712A is arranged on the upper side relative to the protruding part 712B. The protruding part 712C extends in the up and down directions. The upper end of the protruding part 712C is connected to the right end of the protruding part 712A and the lower end of the protruding part 712C is connected to the right end of the protruding part 712B. The positions in the frontward and rearward directions of the individual front end parts of the protruding parts 712A, 712B, and 712C are identical to each other. That is, the individual front end parts of the protruding parts 712A, 712B, and 712C are arranged on a virtual plane perpendicular to the frontward and rearward directions. Hereinafter, the protruding parts 712A, 712B, and 712C are generically referred to as the protruding part 712.

As illustrated in FIG. 15, the liquid crystal display 1072 includes a glass substrate 1072A and a liquid crystal panel 72B. The glass substrate 1072A and the liquid crystal panel 72B are arranged in a portion surrounded by the side plate members 71B, 71C, and 71D within the first holding member 1071. The liquid crystal panel 72B is a well-known liquid crystal panel having a rectangular shape. The liquid crystal panel 72B displays an image in the left side face so as to generate image light. The glass substrate 1072A is provided in the left side face of the liquid crystal panel 72B so as to protect the display surface of the liquid crystal panel 72B. For example, in a case that the liquid crystal panel 72B is a liquid crystal display of reflection type, light from a light source (non-illustrating) enters the liquid crystal panel 72B. The liquid crystal panel 72B reflects the entering light so as to generate image light. The image light generated by the liquid crystal panel 72B is transmitted leftward through the glass substrate 1072A.

The second holding member 1073 includes a substrate holding portion 73A and a control board 73B. The substrate holding portion 73A is arranged on the right side of the liquid crystal panel 72B of the liquid crystal display 1072. The control board 73B is arranged on the right side of the substrate holding portion 73A. The control board 73B is connected through a flexible printed circuit board (not illustrated) to the liquid crystal panel 72B. The communication line 28 (see FIG. 11) is connected to the control board 73B. The control board 73B receives, through the communication line 28, image data transmitted from an external device. The control board 73B outputs a control signal through the flexible printed circuit board to the liquid crystal panel 72B so as to display an image corresponding to the image data onto the liquid crystal panel 72B.

In the present disclosure, in place of the liquid crystal panel 72B, a two-dimensional display apparatus such as a digital mirror device (DMD) and an organic EL display may be employed. Further, a projection device (a retinal scanning display) of retinal scanning type may be employed that projects light obtained by two-dimensional scanning onto the user's retina.

<Lens Unit 6>

The lens unit 6 is arranged on the left side of the image unit 7. The lens unit 6 leads the image light projected from the image unit 7, to the half mirror 56 arranged on the left side of the lens unit 6. The lens unit 6 includes a holding member 61, a cylinder member 62, and a plurality of lenses 63.

Figure 18:
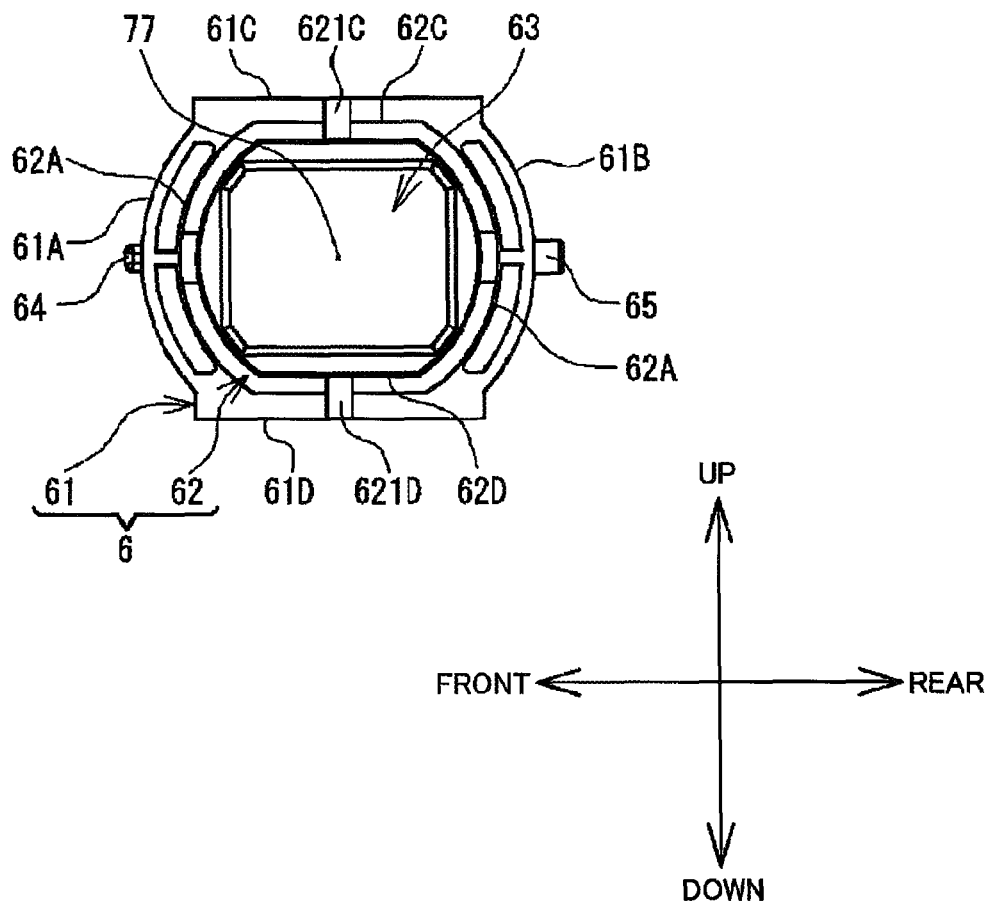
FIG. 18 is a right side view of the lens unit 6.

The holding member 61 is an approximately cylinder-shaped member extending in the right and left directions. The plurality of lenses 63 are fixed to the inner side of the holding member 61. The individual optical axes of the plurality of lenses 63 are arranged on an axis extending in the right and left directions at the center of the holding member 61. As illustrated in FIG. 18, each of the upper portion and the lower portion of the holding member 61 is not curved and extends along a plane perpendicular to the up and down directions. Hereinafter, the upper portion of the holding member 61 is referred to as a plane part 61C. Further, the lower portion of the holding member 61 is referred to as a plane part 61D. A curved part constructed between the individual front end parts of the plane parts 61C and 61D is referred to as a curved part 61A. A curved part constructed between the individual rear end parts of the plane parts 61C and 61D is referred to as a curved part 61B.

Figure 17:
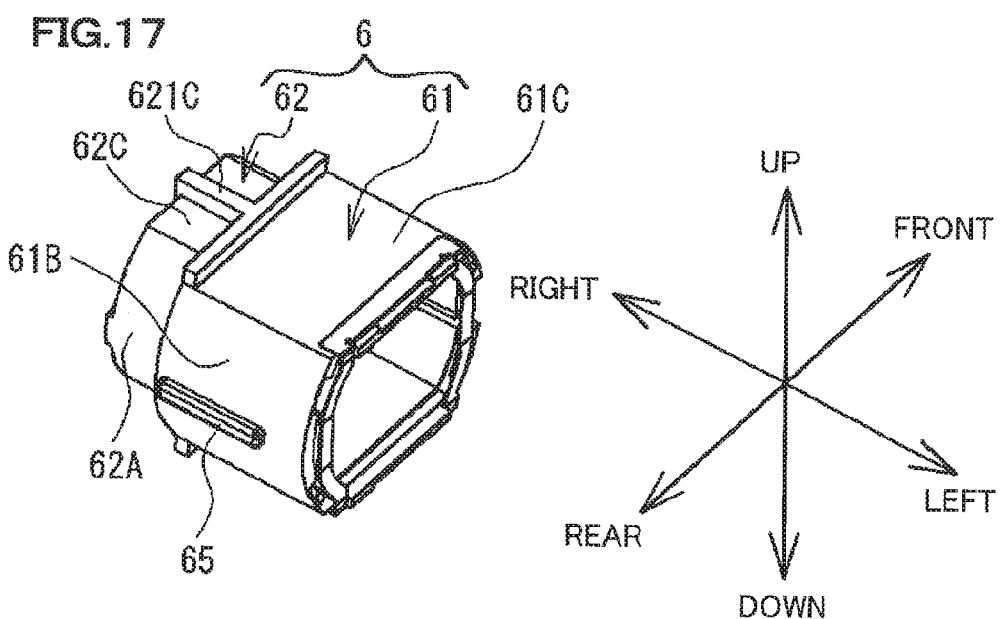
FIG. 17 is a perspective view of a lens unit 6.

A protruding part 64 protruding frontward is provided at a position containing the center in the up and down directions within the curved part 61A. For example, the protruding part 64 is provided symmetric with respect to a plane that passes the center in the up and down directions of the curved part 61A and that is parallel to the frontward and rearward directions and the right and left directions. The protruding part 64 has a cylindrical shape. The protruding part 64 is fit into a cam groove 42 (see FIG. 19) of an engagement part 4B of an adjustment mechanism 4 described later. A protruding part 65 protruding rearward is provided at a position containing the center in the up and down directions within the curved part 61B. For example, the protruding part 65 is provided symmetric with respect to a plane that passes the center in the up and down directions of the curved part 61B and that is parallel to the frontward and rearward directions and the right and left directions. As illustrated in FIG. 17, the protruding part 65 has a rod shape. The length in the right and left directions of the protruding part 65 is longer than the length in the up and down directions. The protruding part 65 is fit into the groove 242 (see FIG. 15) of the fourth housing 24. By virtue of this, the lens unit 6 is held by the rear side housing 14 within the housing 12 in a manner of permitting movement in the right and left directions.

As illustrated in FIG. 15, the cylinder member 62 is an approximately cylinder-shaped member extending in the right and left directions. The cylinder member 62 is provided on the right side of the holding member 61. The individual optical axes 77 (see FIG. 18) of the plurality of lenses 63 are arranged on an axis extending in the right and left directions at the center of the cylinder member 62. As illustrated in FIG. 18, each of the upper portion and the lower portion of the cylinder member 62 is not curved and extends along a plane perpendicular to the up and down directions. Hereinafter, the upper portion of the cylinder member 62 is referred to as a plane part 62C. The lower portion of the cylinder member 62 is referred to as a plane part 62D. The portion of the cylinder member 62 other than the plane parts 62C and 62D, that is, the front side portion and the rear side portion of the cylinder member 62, is referred to as a curved part 62A. The length from the optical axis 77 to the plane parts 62C and 62D is shorter than or equal to the length from the optical axis 77 to the curved part 62A. The length from the optical axis 77 to the plane parts 62C and 62D is the shortest at the center in the frontward and rearward directions of each of the plane parts 62C and 62D. A protruding part 621C protruding upward from the outer face is provided at a position containing the center in the frontward and rearward directions of the plane part 62C. For example, the protruding part 621C is provided symmetric with respect to a plane that passes the center in the frontward and rearward directions of the plane part 62C and that is parallel to the up and down directions and the right and left directions. A protruding part 621D protruding downward from the outer face is provided at a position containing the center in the frontward and rearward directions of the plane part 62D. For example, the protruding part 621D is provided symmetric with respect to a plane that passes the center in the frontward and rearward directions of the plane part 62D and that is parallel to the up and down directions and the right and left directions. Each of the protruding parts 621C and 621D extends between both right and left end parts of the cylinder member 62. The length in the frontward and rearward directions of each of the protruding parts 621C and 621D is substantially identical to the length in the frontward and rearward directions of each of the grooves 713A and 714A (see FIG. 16).

The cross sectional shape of the outer-side wall surface of the cylinder member 62 of the lens unit 6 and the cross sectional shape of the inner-side wall surface of the cylinder member 71A of the image unit 7 are substantially equal to each other. At least a part of the right side of the cylinder member 62 is fit into at least a part of the inner side of the left side of the cylinder member 71A. In this state, the left end part of the cylinder member 71A is arranged on the left side relative to the right end part of the cylinder member 62. The cylinder member 62 and the cylinder member 71A overlap with each other in the right and left directions. At that time, at least a part of the right side of the protruding part 621C of the cylinder member 62, in the region of overlapping with the cylinder member 71A in the right and left directions, is fit into at least a part of the left side of the groove 713A. At least a part of the right side of the protruding part 621D of the cylinder member 62, in the region of overlapping with the cylinder member 71A in the right and left directions, is fit into at least a part of the left side of the groove 714A of the cylinder member 71A.

The image light generated by the image unit 7 enters into the inside of the cylinder member 62 from the right side, then passes the inside of the holding member 61 and the cylinder member 62, and then exits leftward from the left end of the holding member 61. The plurality of lenses 63 causes the image light entering from the right side to be refracted and then exit leftward.

<Operating Member 3>

As illustrated in FIG. 15, the operating member 3 is a truncated-cone shaped member. The center axis of the operating member 3 extends in the frontward and rearward directions. The operating member 3 is rotatable about the center axis serving as a pivot. The operating member 3 includes a front end face 3A, a rear end face 3B, and a side face 3C. The front end face 3A is the bottom part on the front side of the operating member 3. The front end face 3A corresponds to the upper base of the truncated cone shape. The rear end face 3B is the bottom face on the rear side of the operating member 3. The rear end face 3B corresponds to the lower base of the truncated cone shape. The front end face 3A and the rear end face 3B are individually perpendicular to the frontward and rearward directions. In the rear end face 3B, a fitting groove (not illustrated) is provided into which a protruding part 4A (described later) of the adjustment mechanism 4 is fit. The side face 3C corresponds to the side face of the truncated cone shape. The side face 3C is provided with a plurality of depressions and protrusions extending in the frontward and rearward directions. At the time that the user brings the finger into contact with the side face 3C and then applies a force, the depressions and protrusions prevent a situation that the finger slips from the operating member 3.

The rear end face 3B is fit into the recess 21E provided in the first housing 1021. Here, the recess 21E is provided on the left side relative to the center in the right and left directions of the housing 12 within the first housing 1021. Thus, the operating member 3 is arranged on the left side relative to the center in the right and left directions of the housing 12. The distance between the front end face 3A and the rear end face 3B, that is, the length Lh in the frontward and rearward directions of the operating member 3, is set to be a predetermined length (e.g., 3 mm) suitable for operation that the user brings the finger into contact with the side face 3C and then rotates the operating member. Here, the position in the frontward and rearward directions of the rear end face 3B is substantially equal to the position in the frontward and rearward directions of a portion where the operating member 3 is provided within the first surface 21M of the first housing 1021. Thus, as illustrated in FIG. 12, the height (=the length Lh) of the operating member 3 relative to the first surface 21M is 3 mm. Here, in the present disclosure, the length Lh is not limited to 3 mm and may be greater than 3 mm.

By virtue of such a configuration, the user is allowed to bring the finger appropriately into contact with the operating member and then apply a force.

As illustrated in FIG. 12, the diameter Lf of the front end face 3A is smaller than the diameter Lr of the rear end face 3B (see FIG. 15). Thus, the length in the up and down directions of the front end face 3A at a particular position (referred to as a "right-left particular position", hereinafter) in the right and left directions of the operating member 3 is always shorter than the length in the up and down directions of the rear end face 3B at the right-left particular position. Further, the length in the right and left directions of the front end face 3A at a particular position (referred to as a "up-down particular position", hereinafter) in the up and down directions of the operating member 3 is always shorter than the length in the right and left directions of the rear end face 3B at the up-down particular position. Further, in the operating member 3, the angle θ of the side face 3C relative to the direction (the frontward and rearward directions) in which the center axis extends is set to be a predetermined angle (e.g., 40 degrees) in order that in a state that the user holds the housing 12 from up and down by using the thumb and the index finger, the ball of the middle finger and the side face 3C may be parallel to each other to an extent permitting easy operation. Here, in the present disclosure, the angle θ is not limited to 40 degrees and may be smaller than 40 degrees.

By virtue of such a configuration, the portion extending from the other side toward the one side in the second direction (the frontward and rearward directions) of the operating member is inclined in the second direction. Here, in a state that the user holds the housing by the index or middle finger, when the remaining finger is moved to the palm side, the ball of the remaining finger is inclined relative to the ball portion of the index or middle finger. Thus, when the user brings the remaining finger into contact with the operating member, a force is easily applied on the operating member. Thus, the user is allowed to more easily operate the operating member.

Further, the user is allowed to easily apply, onto the portion extending from the other side toward the one side in the second direction within the operating member, a force in a direction perpendicular to the extending direction. Thus, the user is allowed to more easily operate the operating member.

<Adjustment Mechanism 4>

As illustrated in FIG. 15, the adjustment mechanism 4 includes a protruding part 4A and an engagement part 4B. The engagement part 4B is a circular plate-shaped member. The two faces of the engagement part 4B arranged in parallel to each other are directed to the frontward and rearward directions. The side face of the engagement part 4B is provided with a plurality of depressions 1041 extending in the frontward and rearward directions. A flat spring 40 provided in the housing 12 engages with any of the plurality of depressions 1041. The protruding part 4A protrudes frontward from a vicinity of the circle center of the engagement part 4B. The protruding part 4A enters the hole 21D of the first housing 1021 from the rear side and then protrudes toward the front side of the first surface 21M of the first housing 1021. The front end of the portion protruding toward the front side of the first surface 21M within the protruding part 4A is fit into a fitting groove (not illustrated) of the rear end face 3B of the operating member 3 (see FIGS. 24 and 25). By virtue of this, the operating member 3 and the adjustment mechanism 4 are held by the first housing 1021 of the front side housing 13. The adjustment mechanism 4 is rotatable integrally with the operating member 3 about an axis extending in the frontward and rearward directions through the circle center of the engagement part 4B and serving as a pivot. Here, the adjustment mechanism 4 may be formed integrally with the operating member 3.

In a state that the operating member 3 and the adjustment mechanism 4 are held by the first housing 1021, as illustrated in FIG. 12, the diameter Lr of the rear end face 3B (see FIG. 15) is shorter than the length in the up and down directions of the first surface 21M, specifically, the length L1 in the up and down directions between the connection position 212S and the connection position 213S. The upper-side end part of the rear end face 3B is arranged on the lower side relative to the upper-side end part of the first surface 21M, that is, the connection position 212S. Further, the lower-side end part of the rear end face 3B is arranged on the upper side relative to the lower-side end part of the first surface 21M, that is, the connection position 213S.

By virtue of such a configuration, the user is allowed to rotate the operating member by performing the action of moving the remaining finger to the palm side relative to the index or middle finger holding the housing. The action of moving the remaining finger to the palm side relative to the index or middle finger is more natural for the user. Accordingly, in the HMD 1, the operability of the operating member at the time that the user performs focus adjustment is more satisfactory.

Figure 19:
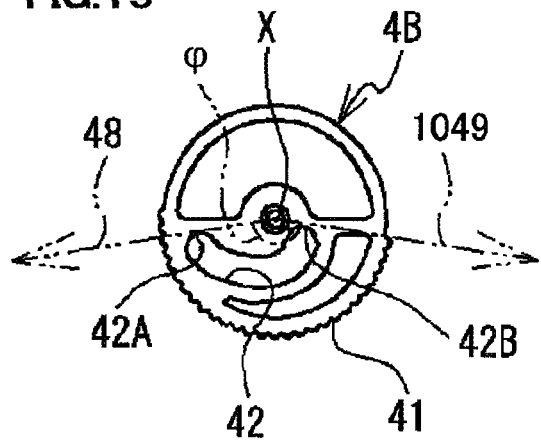
FIG. 19 is a rear view of an adjustment mechanism 4.

As illustrated in FIG. 19, a cam groove 42 is provided in the rear side face of the engagement part 4B. The cam groove 42 is formed such that a part of the rear side face of the engagement part 4B is concave frontward. The cam groove 42 extends spirally around the circle center X of the engagement part 4B. The cam groove 42 departs from the circle center X as rotating clockwise in rear view. Hereinafter, in the description of the shape of the cam groove 42, a rear view is premised. The cam groove 42 includes a first end 42A and a second end 42B. The first end 42A is an end part in the clockwise direction within the cam groove 42. Further, the second end 42B is an end part in the counterclockwise direction. Within the angles formed by the direction 48 of proceeding from the circle center X through the first end 42A to the outside and the direction 1049 of proceeding from the circle center X through the second end 42B to the outside, the angle φ on the cam groove 42 side is 120 degrees. Here, in the present disclosure, the angle φ is not limited to 120 degrees and may be 90 degrees or greater and 180 degrees or smaller. More preferably, the angle φ may be is 90 degrees or greater and 120 degrees or smaller. Needless to say, the angle φ may be smaller than 90 degrees and may be greater than 180 degrees. In a state that the operating member 3 and the adjustment mechanism 4 are held by the first housing 1021, the protruding part 64 of the lens unit 6 is fit into the cam groove 42 from the rear side.

When the rotatable angle of the operating member is 90 degrees or greater and 180 degrees or smaller, since the operating member is allowed to be rotated by 90 degrees or greater, the amount of movement that the lens unit moves per unit amount of rotation of the operating member is suppressed. Thus, the user is allowed to perform fine adjustment of the amount of movement of the lens unit by rotating the operating member. Further, the operating member is not rotated beyond 180 degrees. Thus, at the time of focus adjustment, for the user, the number of times of stretching and retracting the remaining finger is allowed to be suppressed.

Further, when the rotatable angle of the operating member is 90 degrees or greater and 120 degrees or smaller, for the user, at the time of focus adjustment, the number of times of stretching and retracting the remaining finger is allowed to be further suppressed.

<Deflection Unit 59>

The deflection unit 59 includes a half mirror 56 and a holder 5. As illustrated in FIG. 15, the half mirror 56 is arranged on the left side of the lens unit 6. The position of the half mirror 56 relative to the housing 12 is fixed by the holder 5 described later. Thus, the distance from the image unit 7 held at a fixed position relative to the housing 12 is fixed. The half mirror 56 is allowed to reflect rearward the image light entering through the lens unit 6 from the right side. The user's eye is allowed to visually recognize a virtual image on the basis of the image light reflected rearward by the half mirror 56. Further, the half mirror 56 is allowed to transmit rearward the external light entering from the front side.

The half mirror 56 has a rectangular plate shape. For example, the half mirror 56 is constructed in such a manner that metal such as aluminum and silver is deposited onto a substrate made of transparent resin or glass such that a predetermined reflectivity (e.g., 50%) may be obtained. The half mirror 56 is held by the holder 5 described later. One face 56B selected from the two faces of the half mirror 56 held by the holder 5 is directed obliquely rear right and the other face 56C is directed obliquely front left. The half mirror 56 is allowed to reflect a part (e.g., 50%) of the light entering each of the faces 56B and 56C and then transmit the other part.

Here, in the present disclosure, in place of the above-described half mirror 56, a reflecting member may be employed that is allowed to perform total reflection of the image light entering the face 56B, toward the rear side. Further, in place of the half mirror 56, an optical path deflection member such as a prism and a diffraction grating may be employed.

The holder 5 is arranged on the left side of the lens unit 6 and then holds the half mirror 56. As illustrated in FIGS. 20 and 21, the holder 5 includes a base member 50. The base member 50 includes a first end part 51, a second end part 52, a third end part 53, and a fourth end part 54 each having a plate shape. Among three pairs of planes parallel to each other in the first end part 51, each of the pair of planes having the largest area is directed to the right and left directions. The upper and lower edges at the front end of the first end part 51 are curved. The second end part 52 extends rearward from the upper side of the rear end part the of the first end part 51. The third end part 53 extends rearward from the lower side of the rear end part the of the first end part 51. Among three pairs of planes parallel to each other in each of the second end part 52 and the third end parts 53, each of the pair of planes having the largest area is directed to the up and down directions. The fourth end part 54 is constructed between the rear end parts of the second end part 52 and the third end part 53. Among three pairs of planes parallel to each other in the fourth end part 54, each of the pair of planes having the largest area is directed to the frontward and rearward directions. The length in the right and left directions of the fourth end part 54 is shorter than the length in the right and left directions of each of the second end part 52 and the third end part 53. The positions in the right and left directions of the right-end faces of the first end part 51, the second end part 52, the third end part 53, and the fourth end part 54 are identical to each other and hence these faces form the same plane. A hole 51B is formed in the portion surrounded by the first end part 51 to the fourth end part 54. Hereinafter, as illustrated in FIG. 21, the right-end face of each of the first end part 51, the second end part 52, the third end part 53, and the fourth end part 54 is referred to as a first end face 51A, a second end face 52A, a third end face 53A, or a fourth end face 54A.

As illustrated in FIG. 20, a hole 52C penetrating in the up and down directions is provided in a vicinity of the front left corner of the second end part 52. A hole 53C penetrating in the up and down directions is provided in a vicinity of the front left corner of the third end part 53. As illustrated in FIG. 15, the upper side protruding part 56A protruding upward from the upper end part of the half mirror 56 is fit into the hole 52C from the lower side. The lower side protruding part (not illustrated) protruding downward from the lower end part of the half mirror 56 is fit into the hole 53C from the upper side. The holder 5 holds the half mirror 56 in such a manner that the upper side protruding part 56A of the half mirror 56 is supported by the hole 52C and the lower side protruding part (not illustrated) of the half mirror 56 is supported by the hole 53C. The half mirror 56 is arranged on the left side relative to a plane containing the first end face 51A to the fourth end face 54A.

As illustrated in FIGS. 20 and 21, a holder protruding part 52B is provided in the upper face of a portion connected to the fourth end part 54 within the second end part 52. The holder protruding part 52B includes extension parts 521B and 522B. The extension part 521B is a plate-shaped portion protruding leftward relative to the second end face 52A (see FIG. 21). The length in the right and left directions of the extension part 521B is equal to the length (also referred to as the "length in the right and left directions of the groove 221C", hereinafter) in the right and left directions between the upper end of the left end 24C of the fourth extending part 24A and the right end of the rear-side first restriction member 221B (see FIG. 13). The extension part 522B is a plate-shaped portion extending frontward from the left end of the extension part 521B. A holder protruding part 53B is provided in the lower face of a portion connected to the fourth end part 54 within the third end part 53. The holder protruding part 53B includes extension parts 531B and 532B. The extension part 531B is a plate-shaped portion protruding leftward relative to the third end face 53A. The length in the right and left directions of the extension part 531B is equal to the length (also referred to as the "length in the right and left directions of the groove 231C", hereinafter) in the right and left directions between the lower end of the left end 24C of the fourth extending part 24A and the right end of the rear-side first restriction member 231B. The extension part 532B is a plate-shaped portion extending frontward from the left end of the extension part 531B.

As illustrated in FIG. 21, in the fourth end face 54A of the fourth end part 54, a first holder engagement part 541A and second holder engagement parts 542A and 542B are provided. The first holder engagement part 541A protrudes rightward from the front side relative to the center in the up and down directions and in the frontward and rearward directions of the fourth end face 54A. The second holder engagement part 542A protrudes rightward from the upper side relative to the center in the up and down directions of the fourth end face 54A and from the rear side relative to the center in the frontward and rearward directions. The second holder engagement part 542B protrudes rightward from the lower side relative to the center in the up and down directions of the fourth end face 54A and from the rear side relative to the center in the frontward and rearward directions.

Figure 22:
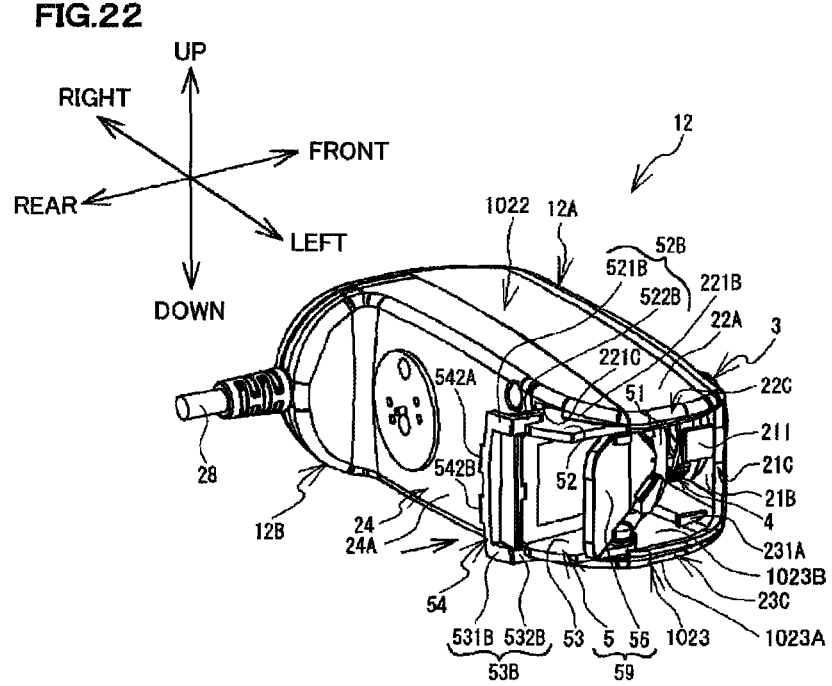
FIG. 22 is a diagram illustrating a situation that the holder 5 and a half mirror 56 are removed from the housing 12.

The deflection unit 59 is supported by the housing 12 in an attachable and detachable manner. FIG. 22 illustrates a situation that the deflection unit 59 is not yet attached to the housing 12. When the holder 5 moves from the rear side to the front side in a region covered in the up and down directions by the second extending part 22A of the second housing 1022 and the third extending part 1023A of the third housing 1023, the deflection unit 59 is attached to the housing 12. In the course that the deflection unit 59 is attached to the housing 12, the holder protruding part 52B of the holder 5 enters the groove 221C of the second extending part 22A from the rear side. Further, the holder protruding part 53B of the holder 5 enters the groove 231C of the third extending part 1023A from the rear side (see FIG. 13). The second end part 52 of the holder 5 moves in parallel along the second back face 22B below the second back face 22B of the second extending part 22A of the housing 12. The third end part 53 of the holder 5 moves in parallel along the third back face 1023B above the third back face 1023B of the third extending part 1023A of the housing 12.

In the course that the deflection unit 59 is attached to the housing 12, the first holder engagement part 541A (see FIG. 21) brings from the rear side into contact with the housing engagement part 241 (see FIG. 13) provided at the left end 24C of the fourth housing 24. When a frontward force is further applied on the holder 5, the fourth end part 54 is warped leftward so that the first holder engagement part 541A climbs over the left side of the housing engagement part 241 and then moves to the front side of the housing engagement part 241.

FIG. 23 illustrates a situation that the deflection unit 59 is attached to the housing 12. The front end of the first end part 51 of the holder 5 brings from the rear side into contact with a vicinity of the left end 21C of the first back face 21B (see FIG. 22) of the first extending part 1021A of the first housing 1021. By virtue of this, frontward movement of the holder 5 is restricted. The holder 5 is arranged in a region covered in the up and down directions by the second extending part 22A of the second housing 1022 and the third extending part 1023A of the third housing 1023. The holder 5 holds the half mirror 56 on the left side relative to the first end face 51A to the fourth end face 54A (see FIG. 21) (see FIG. 15). Thus, the half mirror 56 is arranged on the left side relative to the first back face 21B with which the first end part 51 is in contact.

The left side face of the second restriction member 211 (see FIG. 22) is in contact with a position containing the center in the up and down directions within the first end face 51A (see FIG. 21) of the first end part 51 of the holder 5. The front-side first restriction member 221A (see FIG. 14) is in contact with an upper position within the left end face of the first end part 51 of the holder 5. The right side face of the front-side first restriction member 231A is in contact with a lower position within the left end face of the first end part 51 of the holder 5.

Here, the length between the right end of each of the front-side first restriction members 221A and 231A and the left end of the second restriction member 211 is equal to the length (the thickness) in the right and left directions of the first end part 51 of the holder 5. Thus, in a state that the deflection unit 59 is attached to the housing 12, the right end face of each of the front-side first restriction members 221A and 231A and the left end face of the second restriction member 211 restrict the movement of the front side of the holder 5 in the right and left directions.

The extension part 521B of the holder protruding part 52B (see FIG. 20) is fit into the groove 221C. The right end of the extension part 521B, that is, the rear end part of the second end face 52A, is in contact with the upper end part at the left end 24C of the fourth extending part 24A constituting the groove 221C. The left end of the extension part 521B is in contact with the right end of the rear-side first restriction member 221B. The extension part 531B of the holder protruding part 53B is fit into the groove 231C. The right end of the extension part 531B, that is, the rear end part of the third end face 53A, is in contact with the lower end part at the left end 24C of the fourth extending part 24A constituting the groove 231C. The left end of the extension part 531B is in contact with the right end of the rear-side first restriction member 231B.

The upper side face of the second end part 52 of the holder 5 is arranged below and opposite to the second back face 22B (see FIG. 13) of the second extending part 22A of the housing 12 in a manner of being separated by the amount of upward protrusion of the holder protruding part 52B relative to the second end part 52. The lower side face of the third end part 53 (see FIG. 20) of the holder 5 is arranged above and opposite to the third back face 1023B (see FIG. 13) of the third extending part 1023A of the housing 12 in a manner of being separated by the amount of downward protrusion of the holder protruding part 53B relative to the third end part 53.

Here, the length in the right and left directions of the extension part 521B and the length in the right and left directions of the groove 221C are equal to each other. Further, the length in the right and left directions of the extension part 531B and the length in the right and left directions of the groove 231C are equal to each other. Thus, in a state that the deflection unit 59 is attached to the housing 12, the right end of the rear-side first restriction member 221B and the upper end part at the left end 24C of the fourth extending part 24A that constitute the groove 221C restrict the movement in the right and left directions of the rear side of the holder 5. Further, in a state that the deflection unit 59 is attached to the housing 12, the right end of the rear-side first restriction member 231B and the lower end part at the left end 24C of the fourth extending part 24A that constitute the groove 231C restrict the movement in the right and left directions of the holder 5.

In a state that the deflection unit 59 is attached to the housing 12, the front side face of the housing engagement part 241 (see FIG. 13) is in contact with the rear side face of the first holder engagement part 541A (see FIG. 21). The rear side face of the housing engagement part 241 is in contact with the front side face of each of the second holder engagement parts 542A and 542B. As such, the first holder engagement part 541A and the second holder engagement parts 542A and 542B engage with the housing engagement part 241. Thus, the movement of the holder 5 in the frontward and rearward directions is restricted by the housing engagement part 241 and hence the situation that the deflection unit 59 is attached to the housing 12 is maintained.

<Outlines of Operation (Focus Adjustment)>

Outlines of operation of the HMD 101 are described below. First, the user wears the mounting member 8 (see FIG. 10) of the HMD 101 onto the head. The user holds the body member 11 in a state that the deflection unit 59 is attached to the housing 12, and then adjusts the position such that the half mirror 56 may be arranged in front of the left eye.

Output of image data from an external device (not illustrated) is started. The control board 73B (see FIG. 15) receives the image data through the communication line 28 (see FIG. 11). The control board 73B displays onto the liquid crystal panel 72B an image corresponding to the received image data. The image light of the image displayed on the liquid crystal panel 72B travels leftward through the glass substrate 1072A and the cylinder member 71A, and then exits leftward from the image unit 7. The image light projected from the image unit 7 travels leftward through the plurality of lenses 63 of the lens unit 6 and then exits leftward from the lens unit 6. The half mirror 56 reflects rearward the image light projected from the lens unit 6. The image light enters the user's left eye. Further, the half mirror 56 transmits rearward the external light entering from the front side. By virtue of this, the user recognizes the scene on the front side relative to the body member 11 of the HMD 101, in a manner that the virtual image is overlaid.

The following description is given for the movement of the lens unit 6 at the time that the user rotates the operating member 3 for the purpose of focus adjustment. When the adjustment mechanism 4 rotates in accordance with the rotation of the operating member 3, the protruding part 64 (see FIG. 15) moves along the cam groove 42 (see FIG. 19) of the engagement part 4B. When the lens unit 6 moves in accordance with the movement of the protruding part 64, the groove 242 restricts the movement of the protruding part 65 (see FIG. 17) in the up and down directions. Thus, the lens unit 6 moves in the right and left directions in accordance with the rotation of the adjustment mechanism 4. Here, in the following description of the rotation direction (clockwise rotation or counterclockwise rotation), unless otherwise mentioned, the direction in a situation that the HMD 101 is viewed from the front side is employed.

With reference to FIG. 24, an example that the operating member 3 is rotated clockwise is described in detail. When the adjustment mechanism 4 rotates in accordance with the rotation of the operating member 3, a pair of parallel wall surfaces extending in the frontward and rearward directions so as to form the cam groove 42 (see FIG. 19) exert a rightward force on the protruding part 64 which is in contact, and thereby cause the protruding part 64 to move rightward. In association with the movement of the protruding part 64, the lens unit 6 moves rightward. The cylinder member 62 (see FIG. 15) of the lens unit 6 enters the inside of the cylinder member 71A of the image unit 7. The protruding part 621C (see FIG. 18) of the cylinder member 62 moves rightward along the groove 713A of the cylinder member 71A and then the protruding part 621D (see FIG. 18) of the cylinder member 62 moves rightward along the groove 714A (see FIG. 16) of the cylinder member 71A. When the protruding part 64 brings into contact with the first end 42A (see FIG. 19) of the cam groove 42, the clockwise rotation of the operating member 3 is restricted. At that time, the right end of the holding member 61 of the lens unit 6 approaches the left end of the cylinder member 71A of the image unit 7. The liquid crystal panel 72B (see FIG. 15) of the image unit 7 and the plurality of lenses 63 of the lens unit 6 approach closest to each other. In the following description, the state that the lens unit 6 and the image unit 7 are closest to each other as illustrated in FIG. 15 is referred to as a first state.

With reference to FIG. 25, an example that the operating member 3 is rotated counterclockwise is described in detail. When the adjustment mechanism 4 rotates in accordance with the rotation of the operating member 3, a pair of parallel wall surfaces extending in the frontward and rearward directions so as to form the cam groove 42 (see FIG. 19) exert a leftward force on the protruding part 64 which is in contact, and thereby cause the protruding part 64 to move leftward. In association with the movement of the protruding part 64, the lens unit 6 moves leftward. The cylinder member 62 of the lens unit 6 moves outward left from the inside of the cylinder member 71A of the image unit 7. The protruding part 621C of the cylinder member 62 moves leftward along the groove 713A of the cylinder member 71A and then the protruding part 621D of the cylinder member 62 moves rightward along the groove 714A (see FIG. 16) of the cylinder member 71A. When the protruding part 64 brings into contact with the second end 42B of the cam groove 42, the counterclockwise rotation of the operating member 3 is restricted. At that time, the right end of the holding member 61 of the lens unit 6 departs leftward from the left end of the cylinder member 71A of the image unit 7. The liquid crystal panel 72B (see FIG. 15) of the image unit 7 and the plurality of lenses 63 of the lens unit 6 are most distant from each other. In the following description, the state that the lens unit 6 and the image unit 7 are most distant from each other as illustrated in FIG. 16 is referred to as a second state.

Here, when the lens unit 6 moves in the right and left directions, the spread angle of the image light forming a virtual image visually recognized by the user varies owing to the plurality of lenses 63. Thus, the user is allowed to perform focus adjustment by rotating the operating member 3. Here, as illustrated in FIG. 19, since the angle φ formed by the direction 48 and the direction 1049 is 120 degrees, the rotatable angle of the operating member 3 is also 120 degrees.

When the lens unit 6 moves in the right and left directions in accordance with the rotation of the operating member 3 and the adjustment mechanism 4, the cylinder member 62 and the cylinder member 71A always overlap, at least in part, with each other in the right and left directions. Thus, even when the lens unit 6 moves in the right and left directions, the image light generated by the image unit 7 does not fall outside the image unit 7 and the lens unit 6.

In the course of rotation of the adjustment mechanism 4, the situation varies from a situation that the flat spring 40 (see FIG. 15) engages with one of the plurality of depressions 1041 to a situation that the flat spring 40 engages with the adjacent one of the plurality of depressions 1041. The rotation of the adjustment mechanism 4 is suppressed in a state that the flat spring 40 has engaged with the depression 1041, so that the position of the adjustment mechanism 4 is stabilized. Thus, the operating member 3 and the adjustment mechanism 4 are allowed to be easily held at a desired position and hence the user is allowed to easily perform focus adjustment.

<Effects>

The user wears the mounting member 8 and then arranges the half mirror 56 in front of the left eye (the eye on the right side in front view). Here, as illustrated in FIG. 26, an example is employed that the user pinches the second surface 22M and the third surface 23M of the housing 12 from the up and down directions by using the index finger 1085 and the thumb 87 of the left hand (the hand on the right side in front view) so as to hold the housing 12, and then apples a force on the operating member 3 of the first surface 21M by using the middle finger 86 so as to rotate the operating member 3. Here, the operating member 3 is rotatable about an axis extending in the frontward and rearward directions and serving as a pivot. Thus, the user may move the middle finger 86 toward a direction inclined from upper right to lower left (from upper left to lower right in front view) and is thereby allowed to rotate the operating member 3. Here, the user is allowed to realize the operation of moving the middle finger 86 by stretching and retracting the middle finger 86, as described above. Thus, the user is allowed to naturally perform the operation of rotating the operating member 3. Thus, in the HMD 101, the operability of the operating member 3 at the time that the user performs focus adjustment is satisfactory.

Further, the operating member 3 is provided at a position on the left side relative to the center in the right and left directions of the housing 12 within the first surface 21M (see FIG. 10 or the like). In this case, when the user holds the housing 12 by using the index finger 1085 and the thumb 87 of the left hand (the hand on the right side in front view), the contact areas of the index finger 1085 and the thumb 87 with the housing 12 (the second surface 22M and the third surface 23M) are allowed to made larger. Thus, the user is allowed to operate the operating member 3 in a state that the housing 12 is appropriately held.

The upper end part of the operating member 3 is arranged on the lower side relative to the upper end part of the first surface 21M, that is, the connection position 212S. Further, the lower end part of the operating member 3 is arranged on the upper side relative to the lower end part of the first surface 21M, that is, the connection position 213S. In this case, the user is allowed to move the middle finger 86 on the palm side relative to the index finger 1085 holding the housing 12 and thereby apply a force on the operating member 3 so as to rotate the operating member 3. Here, when the user stretches and retracts the middle finger 86, usually, the middle finger 86 moves on the palm side relative to the index finger 1085. Thus, the user is allowed to appropriately rotate the operating member 3 by the stretching and retracting action of the middle finger 86. As such, in the HMD 101, the operability of the operating member 3 at the time that the user performs focus adjustment is more satisfactory.

The side face 3C of the operating member 3 is inclined in the frontward and rearward directions. Here, in a state that the user holds the housing 12 by using the index finger 1085, when the middle finger 86 is moved to the palm side, the ball portion 86A of the middle finger 86 is inclined relative to the ball portion 85A of the index finger 1085. Thus, when the user brings the middle finger 86 into contact with the operating member 3, a force is easily applied on the operating member 3. Thus, the user is allowed to more easily operate the operating member 3.

The operating member 3 has a frustum shape. Then, the acute angle selected from the angles formed by the frontward and rearward directions and the side face 3C is 40 degrees. Here, the angle of the ball portion 86A of the middle finger 86 relative to the ball portion 85A of the index finger 1085 at the time that the user has moved the middle finger 86 to the palm side is 40 degrees or smaller in many cases. Thus, the user is allowed to easily apply a force by bringing the ball portion 86A of the middle finger 86 into close contact with the side face 3C of the operating member 3. Thus, the user is allowed to more easily operate the operating member 3.

When the operating member 3 is rotated by 120 degrees, the lens unit 6 varies from a state (see FIG. 24) of being moved to the rightmost side to a state (see FIG. 25) of being moved to the leftmost side. Thus, at the time of focus adjustment, the user is not required to rotate the operating member 3 several turns. Accordingly, the response of focus adjustment by the operation of the operating member 3 is allowed to be satisfactory.

The length in the frontward and rearward directions from the first surface 21M of the housing 12 to the front end face 3A of the operating member 3 is 3 mm. In this case, the user is allowed to apply a force by appropriately bringing the ball portion 86A of the middle finger 86 into close contact with the side face 3C of the operating member 3.

The curved portion 212 where the first surface 21M and the second face 22M of the housing 12 are connected together and the curved portion 213 where the first surface 21M and the third face 23M are connected together are individually curved. In this case, in the course that the user brings the middle finger 86 close to the operating member 3 from the second surface 22M, a situation is allowed to be suppressed that the middle finger 86 is caught in the edges of the housing 12. Thus, the user is allowed to smoothly operate the operating member 3.

The distance between the second surface 22M and the third surface 23M is smaller as proceeding from the rear side to the front side. In this case, the index finger 1085 brought into contact with the second surface 22M for the purpose of holding the housing 12 by the user is allowed to be naturally inclined from the obliquely upper rear side to the obliquely lower front side. In this case, the user is allowed to easily incline further the middle finger 86 from the obliquely upper rear side to the obliquely lower front side. Thus, the user is allowed to more easily apply a force on the operating member 3 by using the middle finger 86. Thus, the operating member 3 is allowed to be more easily operated.

The holder 5 and the half mirror 56 are arranged in a region located between the second extending part 22A and the third extending part 1023A in the up and down directions. In this case, by using the index finger 1085 and the thumb 87, the user is allowed to hold the up and down portions of a portion where the half mirror 56 is held within the second surface 22M and the third surface 23M. Thus, the user is allowed to hold the housing 12 by using the index finger 1085 and the thumb 87 and then easily arrange the half mirror 56 in front of the left eye. Further, the half mirror 56 is arranged in a portion located between the second surface 22M and the third surface 23M. Thus, a situation is allowed to be suppressed that the user's finger brings into contact with the half mirror 56 and thereby the half mirror 56 gets dirty. Further, the left end 21C of the first extending part 1021A is curved rightward. Thus, the first extending part 1021A is not arranged in front of the half mirror 56. Accordingly, the external light coming from the front side is not blocked by the first housing 1021 and then appropriately enters the half mirror 56. Thus, in the HMD 101, a situation is allowed to be suppressed that the external light is blocked by the first surface 21M of the first extending part 1021A.

The mounting member 8 of the HMD 101 includes: the first portion 8A extending in the right and left directions and curved convex frontward; and the second portions 8B and 8C extending rearward from both sides of the first portion 8A. Further, the HMD 101 includes the connecting member 9 extending from the first portion 8A of the mounting member 8. The body member 11 is connected to the tip of the connecting member 9. Thus, in a state that the mounting member 8 is attached to the user's head, the half mirror 56 is allowed to be held in front of the user's eye. Accordingly, with visually recognizing the image light deflected by the half mirror 56, the user is allowed to perform work by using both hands.

Here, in the HMD 101, focus adjustment may be achieved by moving the image unit 7 in the right and left directions. Specifically, the situation is as follows. The lens unit 6 may be held by and fixed to the housing 12 and then the image unit 7 may be held in a manner of permitting movement in the right and left directions. A protruding part may be provided in each of the front side face and rear side face of the image unit 7. The front-side protruding part of the image unit 7 may be fit into the cam groove 42 of the adjustment mechanism 4 from the rear side. The rear-side protruding part of the image unit 7 may be fit into the groove 242 of the front side face of the fourth housing 24 from the front side. When the operating member 3 and the adjustment mechanism 4 are rotated, the image unit 7 may move in the right and left directions. Further, a protruding part may be provided in the front side face and rear side face of both of the image unit 7 and the lens unit 6. Focus adjustment may be achieved by moving the image unit 7 and the lens unit 6 in the right and left directions. The housing 12 may cover only a part of the lens unit 6 and the image unit 7.

The protruding part 65 of the lens unit 6 may have cylindrical shapes. The position where the protruding part 65 is provided is not limited to a position containing the center in the up and down directions of the curved part 61B of the lens unit 6 and may be on the upper side or the lower side relative to the center. In place of the protruding part 65 of the lens unit 6, a groove may be provided that extends in the right and left directions and that is concave frontward. In place of the groove 242 of the fourth housing 24, a protruding part protruding frontward may be provided. Then, the protruding part of the fourth housing 24 may be fit into the groove of the lens unit 6 and then the protruding part may move in the right and left directions along the groove so that the lens unit 6 may be allowed to move in the right and left directions.

In place of the protruding part 64 of the lens unit 6, a rack gear extending in the right and left directions may be provided. Then, in place of the cam groove 42 of the adjustment mechanism 4, a pinion gear engaging with the rack gear may be provided. The pinion gear rotates in association with the rotation of the operating member 3 and thereby the rack gear engaging with the pinion gear moves in the right and left directions so that focus adjustment may be achieved.

The operating member 3 and the adjustment mechanism 4 may have an integrated construction. The protruding part 64 of the lens unit 6 may protrude toward the front side of the first housing 1021 through a slit provided in the first housing 1021 of the housing 12. The cam groove 42 may be provided in the rear end face 3B of the operating member 3. The protruding part 64 protruding toward the front side of the first housing 1021 may be fit into the cam groove 42 of the operating member 3. In association with the rotation of the operating member 3, the protruding part 64 moves in the right and left directions along the slit so that the lens unit 6 may move in the right and left directions.

In the above-described HMD 101, in the image unit 7, the grooves 713A and 714A may be provided on the front side or the rear side relative to the center in the frontward and rearward directions within each of the plane parts 713 and 714. In the lens unit 6, the protruding parts 621C and 621D to be fit into the grooves 713A and 714A of the image unit 7 may be provided in each of the plane parts 62C and 62D.

In the image unit 7, a groove may be provided in any of the plane parts 713 and 714. In the lens unit 6, a protruding part to be fit into the groove of the image unit 7 may be provided in any of the plane parts 62C and 62D. In the image unit 7, two or more grooves may be provided in each of the plane parts 713 and 714. In the lens unit 6, two or more protruding parts to be fit into the two or more grooves of the image unit 7 may be provided in each of the plane parts 62C and 62D. In the image unit 7, a groove may be provided in the curved part 715. In the lens unit 6, a protruding part to be fit into the groove of the image unit 7 may be provided in the curved part 62A. The upper end of the groove 713A and the lower end of the groove 714A provided in the plane parts 713 and 714 of the image unit 7 may be opened. That is, the grooves 713A and 714A may have slit shapes. A protruding part may be provided in the plane parts 713 and 714 of the image unit 7. In the plane parts 62C and 62D of the lens unit 6, grooves into which the protruding parts of the plane parts 713 and 714 of the image unit 7 are to be fit may be provided. The image unit 7 may be held by the front side housing 13. In the side plate member 71B of the image unit 7, a pillar or prism protruding frontward may be provided in place of the protruding part 712.

In the configuration given above, the HMD 101 may be not provided with the mounting member 8 and the connecting member 9 and may be constructed from the body member 11 alone. The body member 11 may be fixed directly to the glasses or the like. Further, the HMD 101 may be not provided with the mounting member 8 and may be constructed from the connecting member 9 and the body member 11.

Figure 27:
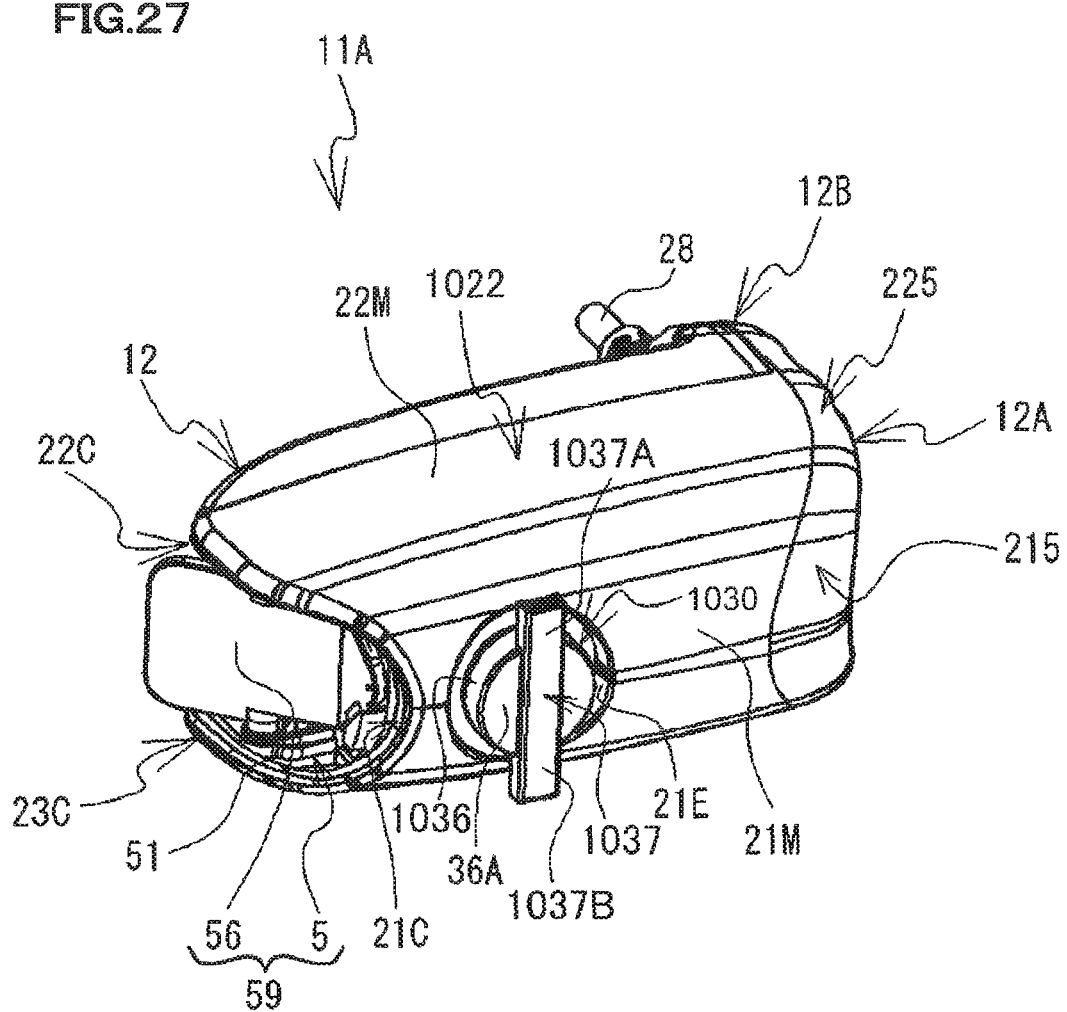
FIG. 27 is a perspective view of a body member 11A of the HMD 101 in a modification.

With reference to FIG. 27, a body member 11A of the HMD 101 in a modification of the present disclosure is described below. The body member 11A is different from the body member 11 (see FIG. 11 or the like) in the point that the operating member 3 is changed into an operating member 1030. The other points are the same. In the following description, the operating member 1030 alone is described and the other points are not described.

In the body member 11A, the operating member 1030 includes a first member 1036 and a second material 1037. The first member 1036 protrudes frontward from the recess 21E of the first surface 21M of the first housing 1021. The first member 1036 has a cylindrical shape. The center axis of the first member 1036 is in parallel to the frontward and rearward directions. The second material 1037 is provided in the front end face 36A of the first member 1036. The second material 1037 has a rod shape whose cross section is rectangular. The second material 1037 extends in a direction (the up and down directions in the case of FIG. 27) perpendicular to the frontward and rearward directions. The length of the second material 1037 is greater than the diameter of the front end face 36A of the first member 1036. The one-side end part 1037A and the other-side end part 1037B of the second material 1037 protrude outside beyond the side face of the first member 1036.

In the rear end face of the first member 1036, a fitting groove (not illustrated) is provided into which a protruding part 4A (see FIG. 15) of the adjustment mechanism 4 is fit. In a state that the protruding part 4A is fit into the fitting groove, the operating member 1030 and the adjustment mechanism 4 are held by the first housing 1021. The operating member 1030 and the adjustment mechanism 4 are integrally rotatable about the center axis of the operating member 1030.

In the above-described case, when the user wears the mounting member 8 and then arranges the half mirror 56 in front of the left eye (the eye on the right side in front view), the user is allowed to easily apply a force on the end part 1037A of the second member 1037 of the operating member 1030 by using the middle finger 86. Thus, the user is allowed to easily rotate the operating member 1030.

Further, in general description, the user may bring a remaining finger other than the fingers holding the housing into contact with the second member and then apply a force so that the operating member is allowed to be easily rotated.

An example is employed that the user arranges the half mirror 56 in front of the right eye (the eye on left side in front view). In this case, in order that the field of view of the user's left eye may be not blocked by the body member 11, the user uses the body member 11 in a state that the second surface 22M of the second housing 1022 is arranged on the lower side and the third surface 23M of the third housing 1023 is arranged on the upper side (that is, the up and down directions are inverted in comparison with the situation in FIG. 10). The end part 1037A of the second material 1037 protrudes downward relative to the first member 1036 and the end part 1037B protrudes upward relative to the first member 1036. In this case, the user is allowed to easily apply a force on the end part 1037B by using the middle finger 86 and hence easily rotate the operating member 1030. As such, in the case of the operating member 1030, even when the operating member 1030 is used in a state that the up and down directions of the body member 11 are inverted, that is, the half mirror 56 is arranged in front of the user's left eye (the eye on the right side in front view), the user is allowed to easily perform focus adjustment.

Here, the present disclosure is not limited to the embodiments or the modifications given above and hence various modifications may be made. In the HMD 101 described above, focus adjustment may be achieved by moving the image unit 7 in the right and left directions. Specifically, the situation is as follows. The image unit 7 may be held in a manner of permitting movement in the right and left directions. A protruding part may be provided in the front side face of the image unit 7. The protruding part of the image unit 7 may be fit into the cam groove 42 of the adjustment mechanism 4 from the rear side. When the operating member 3 or 1030 and the adjustment mechanism 4 are rotated, the image unit 7 may move in the right and left directions. Further, focus adjustment may be achieved by moving both the image unit 7 and the lens unit 6 in the right and left directions.

The housing 12 may cover only a part of the lens unit 6 and the image unit 7. The angle θ formed by the side face of the truncated cone shape of the operating member 3 and the frontward and rearward directions may be greater than 40 degrees. The shape of the operating member 3 may be other than the truncated cone shape. For example, the operating member 3 may have a truncated pyramid shape or, alternatively, a pillar or a prism. The rotatable angle φ of the operating member 3 may be greater than 120 degrees. The length Lh (the height) in the frontward and rearward directions of the operating member 3 may be smaller than 3 mm. The portion where the first surface 21M and the second face 22M of the housing 12 are connected together and the portion where the first surface 21M and the third face 23M are connected together may have sharp edges. The distance between the second surface 22M and the third surface 23M may be uniform. That is, the second surface 22M and the third surface 23M may be in parallel to each other. The housing 12 may have an approximately cylindrical shape whose axis is in the right and left directions.

The left end 21C of the first housing 1021 has been concave rightward from both end parts in the up and down directions toward the center in the up and down directions. Here, a transparent member may be provided in the concave portion. In this case, the positions in the right and left directions of the left end 22C of the second extending part 22A and the left end 23C of the third extending part 1023A may be identical to the position in the right and left directions of the left end of the transparent member.

In the configuration given above, the HMD 101 may be not provided with the mounting member 8 and the connecting member 9 and may be constructed from the body member 11 alone. The body member 11 may be fixed directly to the glasses or the like. Further, the HMD 101 may be not provided with the mounting member 8 and may be constructed from the connecting member 9 and the body member 11.

Figure 28:
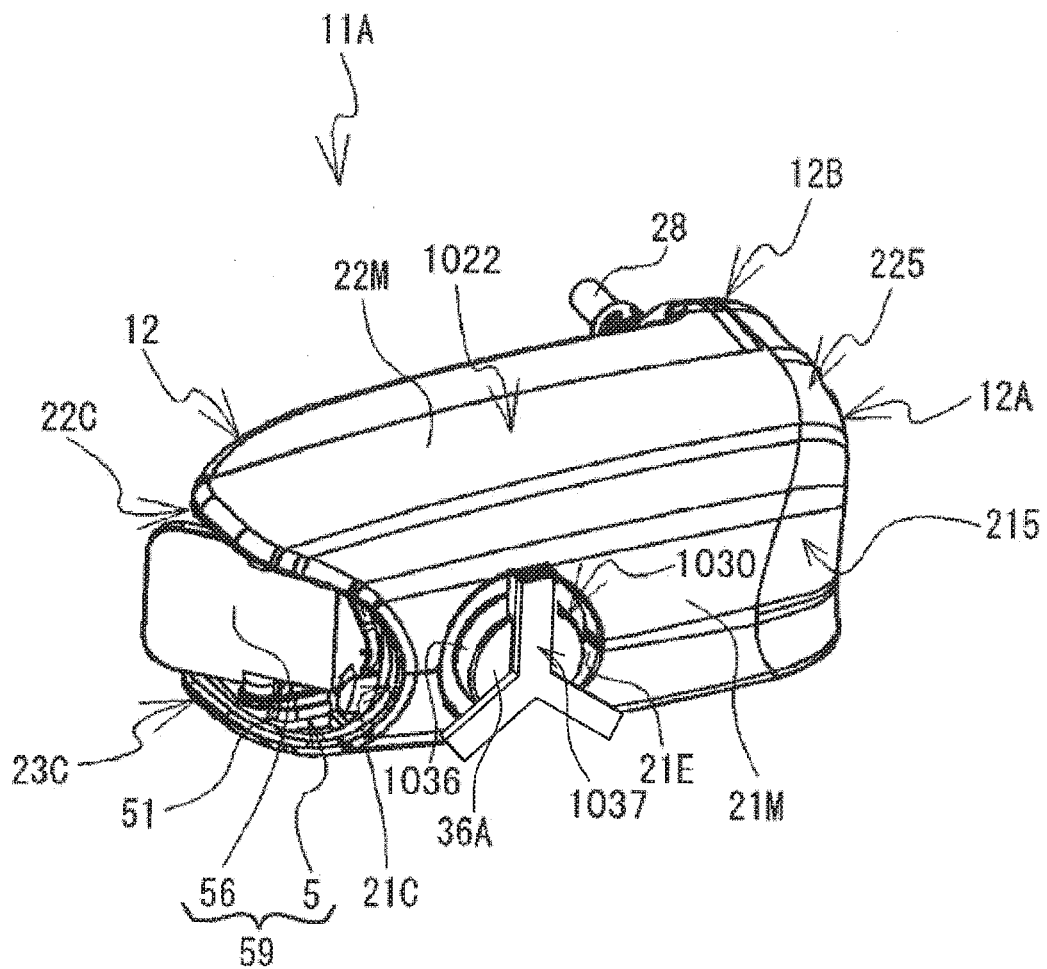
FIG. 28 is a perspective view of the body member 11A of the HMD 101 in a modification.

In the configuration given above, the second member 1037 of the operating member 1030 may be a rod-shaped member extending in one direction from the center of the front end face 36A of the first member 1036. Further, as illustrated in FIG. 28, the second member 1037 may be constructed from a plurality of rod-shaped members extending in three or more directions from the center of the front end face 36A of the first member 1036. By virtue of such a configuration, when the user applies a force on any of the plurality of rod-shaped members (the plurality of protruding parts), the operating member is allowed to be easily operated. Further, the direction where the second member 1037 extends may be inclined relative to a direction perpendicular to the frontward and rearward directions. The second member 1037 of the operating member 1030 may protrude from the side face of the first member 1036.

As this description may be embodied in several forms without departing from the spirit of essential characteristics thereof, the present embodiment is therefore illustrative and not restrictive, since the scope is defined by the appended claims rather than by the description preceding them, and all changes that fall within metes and bounds of the claims, or equivalence of such metes and bounds thereof are therefore intended to be embraced by the claims. Further, in the present specification and the attached claims, any item described in the singular includes such items in the plurality unless indicated specifically in the context.

What is claimed is:

1. An image display apparatus comprising:
    an image unit that generates image light;
    a lens unit including a plurality of lenses whose optical axes extend in a first direction and arranged on one side in the first direction relative to the image unit;
    a housing covering at least a part of the image unit and the lens unit and including, relative to the image unit and the lens unit, at least a first face arranged on one side in a second direction perpendicular to the first direction, a second face extending from one side in a third direction perpendicular toward both the first direction and the second direction within the first face toward another side in the second direction, and a third face extending from another side in the third direction toward the other side in the second direction;
    a deflection member provided on the one side in the first direction of the housing and on the one side in the first direction relative to the lens unit and deflecting the image light led by the lens unit toward the other side in the second direction;
    an operating member that is provided at a position on the one side relative to a center in the first direction of the housing within the first face and that rotates about an axis extending in the second direction as a pivot; and
    an adjustment mechanism that engages with at least one of the image unit and the lens unit and that moves at least one of the image unit and the lens unit toward the first direction in accordance with rotation of the operating member,
    wherein an end part on the one side in the third direction of the operating member is arranged on the other side in the third direction relative to an end part on the one side in the third direction of the first face,
    an end part on the other side in the third direction of the operating member is arranged on the one side in the third direction relative to an end part on the other side in the third direction of the first face,
    a length in the third direction of an end part on the one side in the second direction at a first position in the first direction within the operating member is shorter than a length in the third direction of an end part on the other side in the second direction at the first position within the operating member, and
    a length in the first direction of an end part on the one side in the second direction at a second position in the third direction within the operating member is shorter than a length in the first direction of an end part on the other side in the second direction at the second position within the operating member.

2. The image display apparatus according to claim 1, wherein the operating member has a frustum shape,
    a direction extending from a lower base of the frustum shape toward an upper base of the frustum shape is directed to the one side in the second direction, and
    an acute angle of an angle formed by the second direction and a side face of the frustum shape in the operating member is 40 degrees or smaller.

3. The image display apparatus according to claim 1, wherein the operating member includes a first member extending from the first face toward the one side in the second direction and a second member protruding from the first member toward a direction intersecting with the first direction.

4. The image display apparatus according to claim 3, wherein the second member includes a plurality of protruding parts protruding in directions different from each other.

5. The image display apparatus according to claim 1, wherein a rotatable angle of the operating member is 90 degrees or greater and 180 degrees or smaller.

6. The image display apparatus according to claim 5, wherein the rotatable angle of the operating member is 90 degrees or greater and 120 degrees or smaller.

7. The image display apparatus according to claim 1, wherein a length in the second direction from the first face of the housing to an end part on the one side in the second direction of the operating member is 3 mm or greater.

8. The image display apparatus according to claim 1, wherein a portion where the first face and the second face of the housing are connected together and a portion where the first face and the third face are connected together are curved.

9. The image display apparatus according to claim 1, wherein a distance between the second face and the third face is smaller as approaching the one side from the other side in the second direction.

10. The image display apparatus according to claim 1, wherein an end part on the one side in the first direction of the first face is arranged on another side in the first direction relative to an end part on the one side in the first direction of each of the second face and the third face, and the deflection member is arranged in a portion located between the second face and the third face and a position in the first direction of the deflection member is on the one side relative to the first face.

11. A head mount display comprising:

the image display apparatus according to claim 1;

a mounting member including a first portion extending in the first direction and a pair of second portions extending from both sides of the first portion toward the other side in the second direction; and a connecting member connected to the first portion of the mounting member and connected to the image display apparatus.

12. The head mount display according to claim 11, wherein the first portion is curved convexly toward the one side in the second direction, the connecting member extends from the first portion along the third direction, one end of the connecting member is connected to the mounting member, and another end of the connecting member is connected to the image display apparatus.

* * * * *